(12) United States Patent
Robinson

(10) Patent No.: US 11,394,588 B2
(45) Date of Patent: *Jul. 19, 2022

(54) COMMUNICATION SYSTEM AND METHOD USING UNITARY BRAID DIVISIONAL MULTIPLEXING (UBDM) WITH PHYSICAL LAYER SECURITY

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,118

(22) Filed: Jan. 28, 2021

(65) Prior Publication Data
US 2021/0184899 A1 Jun. 17, 2021

Related U.S. Application Data

(63) Continuation of application No. 16/527,240, filed on Jul. 31, 2019, now Pat. No. 10,951,442.

(51) Int. Cl.
*H04L 25/03* (2006.01)
*H04W 12/03* (2021.01)
(Continued)

(52) U.S. Cl.
CPC ....... *H04L 25/0391* (2013.01); *H04B 7/0413* (2013.01); *H04L 27/2602* (2013.01); *H04W 12/03* (2021.01)

(58) Field of Classification Search
CPC ............ H04L 25/0391; H04L 27/2602; H04B 7/0417; H04B 7/0478; H04B 7/0456; H04B 7/0626; H04B 7/0639; H04B 7/0632
See application file for complete search history.

(56) References Cited

U.S. PATENT DOCUMENTS

| | | | |
|---|---|---|---|
| 5,237,587 A | 8/1993 | Schoolcraft | |
| 5,345,599 A | 9/1994 | Paulraj et al. | |

(Continued)

FOREIGN PATENT DOCUMENTS

| | | | |
|---|---|---|---|
| CN | 1813435 A | 8/2006 | |
| CN | 101179539 A | 5/2008 | |

(Continued)

OTHER PUBLICATIONS

Ericsson, "Signature design for NoMA," 3GPP TSG-RAN WG1 Meeting #93, Tdoc R1-1806241, Busan, South Korea, May 21-25, 2018, pp. 1-5.

(Continued)

*Primary Examiner* — Aristocratis Fotakis
(74) *Attorney, Agent, or Firm* — Cooley LLP

(57) ABSTRACT

A system includes first and second sets of communication devices. A processor coupled to the first set of communication devices produces a first encoded vector and transmits the first encoded vector to the second set of communication devices via a communication channel that applies a channel transformation to the first encoded vector during transmission. A processor coupled to the second set of communication devices receives the transformed signal, detects an effective channel thereof, and identifies left and right singular vectors of the effective channel. A precoding matrix is selected from a codebook of unitary matrices based on a message, and a second encoded vector is produced based on a second known vector, the precoding matrix, a complex conjugate of the left singular vectors, and the right singular vectors. The second encoded vector is sent to the first set of communication devices for identification of the message.

18 Claims, 10 Drawing Sheets

(51) Int. Cl.
  *H04B 7/0413* (2017.01)
  *H04L 27/26* (2006.01)

(56) References Cited

U.S. PATENT DOCUMENTS

| | | | |
|---|---|---|---|
| 5,555,268 | A | 9/1996 | Fattouche et al. |
| 6,389,138 | B1 | 5/2002 | Li et al. |
| 7,376,173 | B2 | 5/2008 | Yedidia et al. |
| 7,454,084 | B2 | 11/2008 | Faber et al. |
| 8,320,507 | B2 | 11/2012 | Higuchi |
| 8,737,509 | B2 | 5/2014 | Yu et al. |
| 9,648,444 | B2 | 5/2017 | Agee |
| 10,020,839 | B2 | 7/2018 | Robinson et al. |
| 10,491,262 | B2 | 11/2019 | Robinson et al. |
| 10,637,705 | B1 | 4/2020 | Shattil |
| 10,735,062 | B1 | 8/2020 | Robinson |
| 10,771,128 | B1 | 9/2020 | Sitaram et al. |
| 10,819,387 | B2 | 10/2020 | Robinson et al. |
| 10,833,749 | B1 | 11/2020 | Robinson |
| 10,873,361 | B2 | 12/2020 | Robinson |
| 10,917,148 | B2 | 2/2021 | Robinson |
| 10,965,352 | B1 | 3/2021 | Robinson |
| 11,018,715 | B2 | 5/2021 | Robinson et al. |
| 11,025,470 | B2 | 6/2021 | Robinson |
| 11,050,604 | B2 | 6/2021 | Robinson |
| 2002/0009209 | A1 | 1/2002 | Inoue et al. |
| 2003/0185309 | A1 | 10/2003 | Pautler et al. |
| 2003/0210750 | A1 | 11/2003 | Onggosanusi et al. |
| 2004/0059547 | A1 | 3/2004 | Aftelak |
| 2004/0105489 | A1 | 6/2004 | Kim et al. |
| 2004/0253986 | A1 | 12/2004 | Hochwald et al. |
| 2006/0109897 | A1 | 5/2006 | Guo et al. |
| 2006/0274825 | A1 | 12/2006 | Ciofi et al. |
| 2007/0091999 | A1 | 4/2007 | Nissan-Cohen et al. |
| 2007/0098063 | A1 | 5/2007 | Reznic et al. |
| 2007/0115797 | A1 | 5/2007 | Reznic et al. |
| 2007/0211786 | A1 | 9/2007 | Shattil |
| 2007/0281746 | A1* | 12/2007 | Takano ............... H04B 7/0634 455/562.1 |
| 2009/0046801 | A1 | 2/2009 | Pan et al. |
| 2009/0316802 | A1 | 12/2009 | Tong et al. |
| 2010/0119001 | A1 | 5/2010 | Walton et al. |
| 2010/0150266 | A1* | 6/2010 | Mondal ............... H04B 7/0639 375/296 |
| 2010/0202553 | A1 | 8/2010 | Kotecha et al. |
| 2010/0246656 | A1 | 9/2010 | Hammerschmidt |
| 2010/0329393 | A1 | 12/2010 | Higuchi |
| 2011/0134902 | A1 | 6/2011 | Ko et al. |
| 2011/0235728 | A1 | 9/2011 | Karabinis |
| 2012/0093090 | A1 | 4/2012 | Han et al. |
| 2012/0236817 | A1* | 9/2012 | Chen ................... H04B 7/0486 370/329 |
| 2012/0257664 | A1 | 10/2012 | Yue et al. |
| 2012/0307937 | A1* | 12/2012 | Higuchi ............. H04L 27/2623 375/296 |
| 2013/0064315 | A1 | 3/2013 | Heath, Jr. et al. |
| 2013/0100965 | A1 | 4/2013 | Ohmi et al. |
| 2013/0223548 | A1 | 8/2013 | Kang et al. |
| 2014/0056332 | A1 | 2/2014 | Soualle et al. |
| 2015/0003500 | A1 | 1/2015 | Kesling et al. |
| 2015/0049713 | A1* | 2/2015 | Lan ..................... H04L 9/0844 370/329 |
| 2015/0171982 | A1 | 6/2015 | Wang et al. |
| 2015/0304130 | A1 | 10/2015 | Logothetis et al. |
| 2016/0309396 | A1* | 10/2016 | Chai ................... H04W 16/28 |
| 2016/0337156 | A1 | 11/2016 | Milleth et al. |
| 2017/0180020 | A1 | 6/2017 | Namgoong et al. |
| 2017/0237545 | A1 | 8/2017 | Khandani |
| 2017/0288902 | A1 | 10/2017 | Rusek et al. |
| 2017/0294946 | A1 | 10/2017 | Wang et al. |
| 2017/0302415 | A1* | 10/2017 | Park ................... H04B 7/0669 |
| 2017/0331539 | A1 | 11/2017 | Pham et al. |
| 2019/0075091 | A1 | 3/2019 | Shattil et al. |
| 2019/0097694 | A1* | 3/2019 | Jeon ................... H04B 7/0456 |
| 2019/0115960 | A1 | 4/2019 | Jiang et al. |
| 2019/0158206 | A1 | 5/2019 | Li et al. |
| 2019/0215222 | A1 | 7/2019 | Cheng et al. |
| 2019/0260444 | A1* | 8/2019 | Hauzner ............. H04B 7/0617 |
| 2019/0268035 | A1 | 8/2019 | Robinson et al. |
| 2019/0280719 | A1 | 9/2019 | Yu |
| 2019/0349042 | A1 | 11/2019 | Ramireddy et al. |
| 2019/0349045 | A1 | 11/2019 | Varatharaajan et al. |
| 2019/0379430 | A1* | 12/2019 | Pekoz ................. H04B 7/0417 |
| 2020/0007204 | A1 | 1/2020 | Jeon et al. |
| 2020/0014407 | A1 | 1/2020 | Smith et al. |
| 2020/0366333 | A1 | 11/2020 | Robinson |
| 2021/0006288 | A1 | 1/2021 | Robinson et al. |
| 2021/0006303 | A1 | 1/2021 | Robinson |
| 2021/0006317 | A1 | 1/2021 | Robinson |
| 2021/0006446 | A1 | 1/2021 | Robinson |
| 2021/0006451 | A1 | 1/2021 | Robinson |
| 2021/0013936 | A1* | 1/2021 | Zhu .................... H04B 7/0486 |
| 2021/0036901 | A1 | 2/2021 | Robinson |
| 2021/0067211 | A1 | 3/2021 | Robinson |
| 2021/0159950 | A1 | 5/2021 | Robinson |
| 2021/0409193 | A1 | 12/2021 | Robinson |
| 2022/0006504 | A1 | 1/2022 | Robinson |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| JP | 2003-198500 A | 7/2003 |
| JP | 2013-162293 A | 8/2013 |
| KR | 10-2010-0131373 A | 12/2010 |
| KR | 10-2013-0118525 A | 10/2013 |
| WO | WO 2006/025382 A1 | 3/2006 |
| WO | WO 2008/024773 A2 | 2/2008 |
| WO | WO 2008/098225 A2 | 8/2008 |

OTHER PUBLICATIONS

Huang et al., "Multi-dimensional encryption scheme based on physical layer for fading channel," IET Communications, Oct. 2018, vol. 12, Issue 19, pp. 2470-2477.

Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.

Huo and Gong, "A New Efficient Physical Layer OFDM Encryption Scheme," IEEE INFOCOM 2014, IEEE Conference on Computer Communications, pp. 1024-1032.

International Search Report and Written Opinion for PCT Application No. PCT/US2017/061489, dated Feb. 26, 2018, 8 pages.

International Search Report and Written Opinion for International Application No. PCT/US2020/040393, dated Sep. 3, 2020, 12 pages.

International Search Report and Written Opinion for International Application No. PCT/US2020/039879, dated Oct. 9, 2020, 10 pages.

International Search Report and Written Opinion for International Application No. PCT/US2020/039606, dated Nov. 25, 2020, 18 pages.

International Search Report and Written Opinion for International Application No. PCT/US2020/043686, dated Dec. 3, 2020, 24 pages.

International Search Report and Written Opinion for International Application No. PCT/US2020/051927, dated Jan. 15, 2021, 19 pages.

International Search Report and Written Opinion for International Application No. PCT/US2020/049031, dated Jan. 18, 2021, 20 pages.

International Search Report and Written Opinion for International Application No. PCT/US2021/017043, dated May 14, 2021, 12 pages.

Invitation to Pay Additional Fees for International Application No. PCT/US2020/039606 dated Sep. 21, 2020, 12 pages.

(56) References Cited

OTHER PUBLICATIONS

Invitation to Pay Additional Fees for International Application No. PCT/US2020/043686 dated Oct. 7, 2020, 16 pages.
Invitation to Pay Additional Fees for International Application No. PCT/US2020/049031 dated Nov. 11, 2020, 13 pages.
Liu et al., "Piecewise Chaotic Permutation Method for Physical Layer Security in OFDM-PON," IEEE Photonics Technology Letters, Nov. 2016, vol. 28, No. 21, pp. 2359-2362.
Ma et al., "Secure Communication in TDS-OFDM System Using Constellation Rotation and Noise Insertion," IEEE Transactions on Consumer Electronics, Aug. 2010, vol. 56, No. 3, pp. 1328-1332.
Non-Final Office Action for U.S. Appl. No. 16/459,254 dated Nov. 5, 2020, 9 pages.
Sung et al., "M-PSK Codebook Based Clustered MIMO-OFDM SDMA with Efficient Codebook Search," IEEE, 2012, 5 pages.
Tseng et al., "Hardware Implementation of the Joint Precoding Sub-System and MIMO Detection Preprocessor in IEEE 802.11n/ac WLAN," Journal of Signal Processing Systems (2019) 91:875-884.
Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.
Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE 0802.16m-08/1183r1, Sep. 12, 2008, pp. 1-9.
Korean Office Action for Korean Application No. 10-2019-7016867 dated Dec. 20, 2021, 11 pages with English translation.
Strohmer et al., "Grassmannian frames with applications to coding and communication," Appl. Comput. Harmon. Anal. (2003)14: 257-275.
Tsiligianni et al., "Construction of Incoherent Unit Norm Tight Frames With Application to Compressed Sensing," IEEE Transactions on Information Theory, Apr. 2014, vol. 60, No. 4. pp. 2319-2330.
International Preliminary Report on Patentability for International Application No. PCT/US2020/043686, dated Feb. 10, 2022, 16 pages.
International Preliminary Report on Patentability in International Application No. PCT/US2020/039879 dated Jan. 13, 2022, 8 pages.
International Preliminary Report on Patentability in International Application No. PCT/US2020/040393 dated Jan. 13, 2022, 9 pages.
International Preliminary Report on Patentability in International Application No. PCT/US2020/039606 dated Jan. 13, 2022, 13 pages.
International Preliminary Report on Patentability for International Application No. PCT/US2020/051927, dated Apr. 7, 2022, 14 pages.
International Preliminary Report on Patentability for International Application No. PCT/US2020/049031, dated Mar. 8, 2022, 15 pages.

* cited by examiner

COMMUNICATION SYSTEM AND METHOD USING UNITARY BRAID DIVISIONAL MULTIPLEXING (UBDM) WITH PHYSICAL LAYER SECURITY

CROSS-REFERENCE TO RELATED APPLICATIONS

This application is a continuation of U.S. patent application Ser. No. 16/527,240, filed Jul. 31, 2019 and titled "Communication System and Method Using Unitary Braid Divisional Multiplexing (UBDM) with Physical Layer Security," the disclosure of which is incorporated by reference herein in its entirety, This application is related to U.S. Nonprovisional patent application Ser. No. 15/351,428, filed on Nov. 14, 2016 and titled "RELIABLE ORTHOGONAL SPREADING CODES IN WIRELESS COMMUNICATIONS" (now U.S. Pat. No. 10,020,839) and U.S. patent application Ser. No. 16/459,245, filed on Jul. 1, 2019 and titled "SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING," the disclosures of each of which are herein incorporated by reference in their entireties.

STATEMENT REGARDING FEDERAL GOVERNMENT INTEREST

This United States Government holds a nonexclusive, irrevocable, royalty-free license in the invention with power to grant licenses for all United States Government purposes.

TECHNICAL FIELD

This description relates to systems and methods for transmitting wireless signals for electronic communications and, in particular, to wireless communications with physical layer security.

BACKGROUND

In multiple access communications, multiple user devices transmit signals over a given communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital-to-analog converter, and then up-converted to the carrier frequency for transmission. When different user devices send symbols at the same time over the communications channel, the sine waves represented by those symbols are superimposed to form a combined signal that is received at the receiver.

A known approach to wireless signal communication is orthogonal frequency-division multiplexing (OFDM), which is a method of encoding digital data on multiple carrier frequencies. OFDM methods have been adapted to permit signal communications that cope with severe conditions of communication channels such as attenuation, interference, and frequency-selective fading. Such an approach, however, does not address a desire for a physical layer of security of signal transmission. Furthermore, the OFDM signal includes signal amplitudes over a very large dynamic range, often requiring transmitters that can handle a high peak-to-average-power ratio.

Thus, a need exists for improved systems, apparatuses and methods for a secure, power efficient approach to wireless communication of signals.

SUMMARY

In some embodiments, a system includes first and second sets of communication devices. A processor coupled to the first set of communication devices produces a first encoded vector and transmits the first encoded vector to the second set of communication devices via a communication channel that applies a channel transformation to the first encoded vector during transmission. A processor coupled to the second set of communication devices receives the transformed signal, detects an effective channel thereof, and identifies left and right singular vectors of the effective channel. A precoding matrix is selected from a codebook of unitary matrices based on a message, and a second encoded vector is produced based on a second known vector, the precoding matrix, a complex conjugate of the left singular vectors, and the right singular vectors. The second encoded vector is sent to the first set of communication devices for identification of the message.

In some embodiments, a communication method using unitary braid divisional multiplexing (UBDM) with physical layer security includes receiving, via a first communication device and at a first processor, a signal representing a first encoded vector and a channel transformation. The first processor detects a representation of an effective channel based on the received signal, and performs a singular value decomposition of the representation of the effective channel to identify left singular vectors of the representation of the effective channel and right singular vectors of the representation of the effective channel. The first processor selects a precoding matrix from a codebook of unitary matrices, the precoding matrix associated with an index for a message for transmission. The first processor produces a second encoded vector based on a second known vector, the precoding matrix, a complex conjugate of the left singular vectors, and the right singular vectors of the representation of the effective channel, and transmits a signal representing the second encoded vector, through a communication channel, to a second communication device, for identification of the message at a second processor operably coupled to the second communication device.

In some embodiments, a communication method using UBDM or OFDM with physical layer security includes generating, at a first processor of a first communication device, a first encoded vector using a first known vector and a unitary matrix. A first signal representing the first encoded vector is transmitted to a second communication device through a communication channel that applies a channel transformation to the first signal during transmission. A second signal representing a second encoded vector and the channel transformation is received at the first processor from the second communication device, and the first processor detects a representation of an effective channel based on the second signal. The first processor performs a singular value decomposition of the representation of the effective channel to identify right singular vectors of the representation of the effective channel, and queries a codebook of unitary matrices to identify a message associated with the second signal based on the right singular vectors of the representation of the effective channel and the unitary matrix.

In some embodiments, a communication method using UBDM or OFDM with physical layer security includes applying an arbitrary transformation to a plurality of vectors to produce a plurality of transformed vectors. The arbitrary transformation includes one of a unitary transformation, an equiangular tight frame (ETF) transformation, or a nearly equiangular tight frame (NETF) transformation. Using the arbitrary transformation, a transformed signal is produced based on at least one transformed vector from the plurality of transformed vectors. The transformed signal is transmitted, via a communications channel, to a signal receiver that is configured to detect the transformed signal. A signal representing the arbitrary transformation is provided to the signal receiver, for recovery of the plurality of vectors at the signal receiver based on the arbitrary transformation and one of a location-specific physical characteristic of the communications channel or a device-specific physical characteristic of the communications channel.

DETAILED DESCRIPTION

Figure 1:
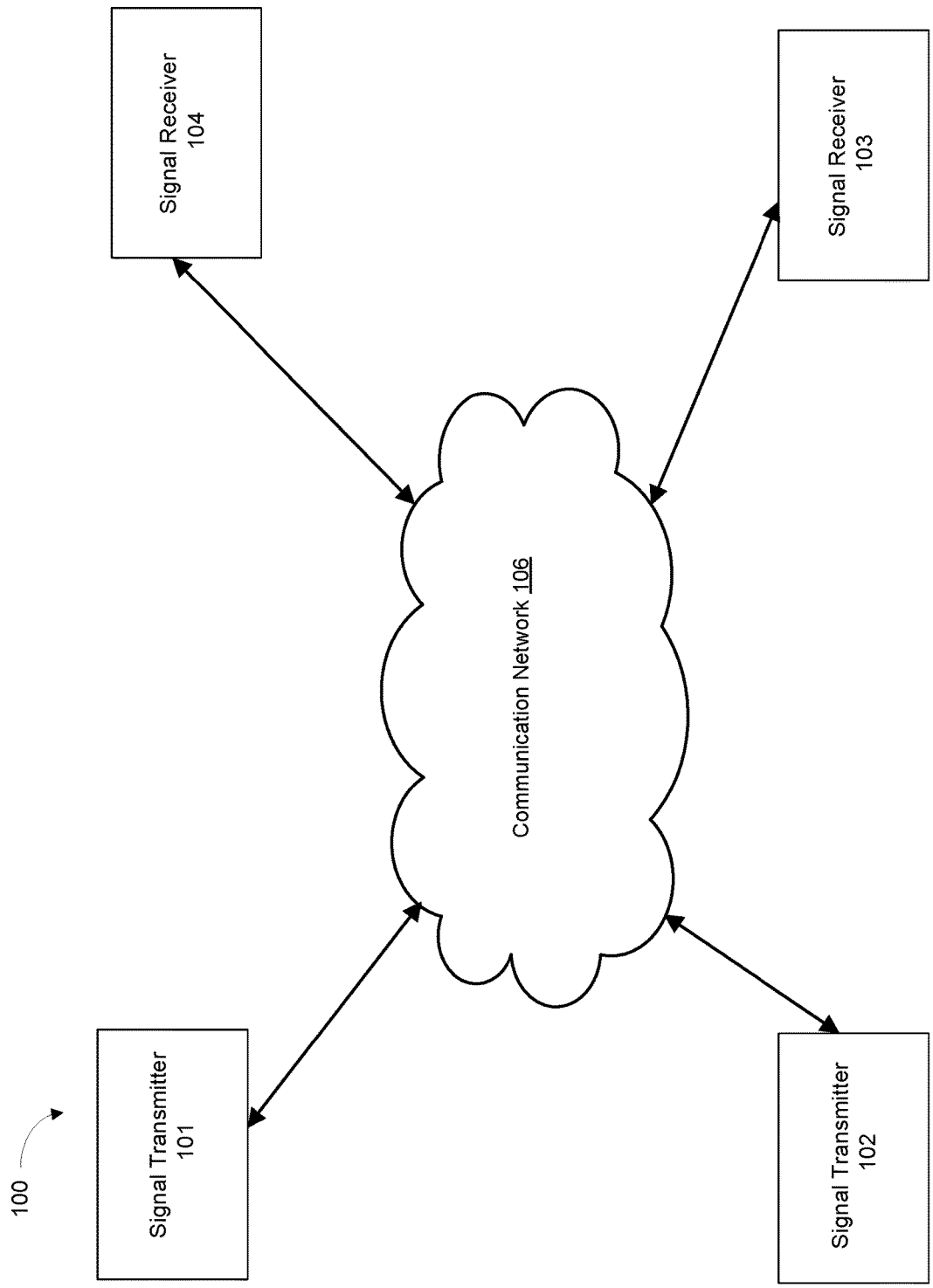
FIG. 1 is a schematic illustration of a secure and efficient generalized Unitary Braid Divisional Multiplexing (gUBDM) system, according to an embodiment.

The present disclosure sets forth a generalized Unitary Braid Divisional Multiplexing (gUBDM) system for modulation-based communications security, followed by a UBDM or OFDM system implementation that includes Physical Layer Security (PLS). The PLS can be referred to as "enhanced MOPRO," and includes a modified version of a key exchange algorithm referred to as MIMO-OFDM Precoding with Rotation (MOPRO).

In some embodiments set forth herein, a gUBDM includes a modified Orthogonal Frequency Divisional Multiplexing (OFDM) system. The modified OFDM system can include some components common to an unmodified OFDM system, but also includes a generalized version of an OFDM component (e.g., a subset of the functionality of the OFDM). The gUBDM system can be designed to implement (e.g., in hardware and/or software executed by or stored in hardware) a modified OFDM step during operation, to execute a paired operation including performing an inverse Fast Fourier Transform (iFFT) (or a Fast Fourier Transform FFT) of signals at a signal transmitter to generate transformed signals that are transmitted, and then performing a Fast Fourier Transform (FFT) (or an inverse Fourier Transform iFFT) on the transformed signals at a receiver to recover the signals. The modification includes generalizing the iFFT/FFT performed by the transmitter to an arbitrary transformation (represented by an arbitrary matrix, for example an arbitrary unitary matrix).

Embodiments of a gUBDM system, as described in further detail herein, and including embodiments with the above modification of an OFDM system, can impart exceptional security and efficiency in transmission of signals over wireless communication channels. Other benefits of embodiments of the gUBDM as described herein include an ability to use non-linear transformations, as well as a generalized implementation involving equiangular tight frame (ETF) transformations or nearly equiangular tight frame (NETF) transformations as an example. Standard OFDM doesn't allow for a generalization to ETF/NETF "overloading".

Generalizing to an arbitrary unitary as implemented in a gUBDM system as described herein can also have the effect of spreading the energy of each symbol or vector in a signal to be transmitted across the different subcarriers. Spreading the energy of each symbol or vector in a signal to be transmitted can reduce the Peak-to-Average-Power-Ratio (PAPR) of the signal, and provide a degree of spreading (and, therefore, interference rejection) that is comparable to systems such as Direct Sequence Spread Spectrum (DSSS) systems. Spreading the energy of each symbol or vector in a signal to be transmitted can also provide an extra degree of freedom in multiplexing. In other words, in addition to standard frequency division multiplexing and time division multiplexing, a gUBDM system introduces code division multiplexing, which adds a powerful degree of freedom for multiplexing in a signal transmission system.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

FIG. 1 is a schematic illustration of a secure and efficient, generalized Unitary Braid Divisional Multiplexing system 100, also referred to herein as a "gUBDM system" or "a system," according to an embodiment. The gUBDM 100 is configured to send and/or receive wireless electronic communications in a secure and efficient manner. The gUBDM system 100 includes signal transmitters 101 and 102, signal receivers 103 and 104, and a communication network 106, as illustrated in FIG. 1. The gUBDM system 100 is configured to process and transmit a signal from the signal transmitters 101 and 102 via one or more communication channels defined via the communication network to the signal receivers 103 and 104. Given a signal to be transmitted from a signal transmitter 101 and/or 102 and to a signal receiver 103 and/or 104, the gUBDM system 100 is configured such that the signal transmitter 101 and/or 102 can process the signal by applying an arbitrary transformation to generate a transformed signal that is transmitted to the signal receivers 103 and/or 104. The arbitrary transformation can be applied using one or more of hardware, software, a field-programmable gate array (FPGA), etc. The signal transmitters 101 and/or 102 also send to the signal receivers 103 and/or 104 (e.g., before transmitting the signal) an indication of the arbitrary transformation that was applied. The signal receivers 103 and/or 104 are configured to receive the transformed signal and the indication of the arbitrary transformation applied by the signal transmitter(s) and apply an inverse of the arbitrary transformation to recover the signal from the transformed signal. While the system 100 is illustrated to include two signal transmitters 101 and 102, and two signal receivers 103 and 104, a similar gUBDM system can include any number of signal transmitters and/or signal receivers.

In some embodiments, the communication network 106 (also referred to as "the network") can be any suitable communications network that includes one or more communication channels configured for wirelessly transferring data, operating over public and/or private networks. Although not shown, in some implementations, the signal transmitters 101,102 and signal receivers 103,104 (or portions thereof) can be configured to operate within, for example, a data center (e.g., a cloud computing environment), a computer system, one or more server/host devices, and/or so forth. In some implementations, the signal transmitters 101,102 and signal receivers 103,104 can function within various types of network environments that can include one or more devices and/or one or more server devices. For example, the network 106 can be or can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), a Bluetooth® network, a virtual network, and/or any combination thereof. In some instances, the communication network 106 can be a wireless network such as, for example, a Wi-Fi or wireless local area network ("WLAN"), a wireless wide area network ("WWAN"), and/or a cellular network. The communication network 106 can be, or can include a wireless network and/or wireless network implemented using, for example, gateway devices, bridges, switches, and/or so forth. The network 106 can include one or more segments and/or can have portions based on various protocols such as Internet Protocol (IP) and/or a proprietary protocol. The communication network 106 can include at least a portion of the Internet. In some instances, the communication network 106 can include multiple networks or subnetworks operatively coupled to one another by, for example, network bridges, routers, switches, gateways and/or the like (not shown).

Figure 2:
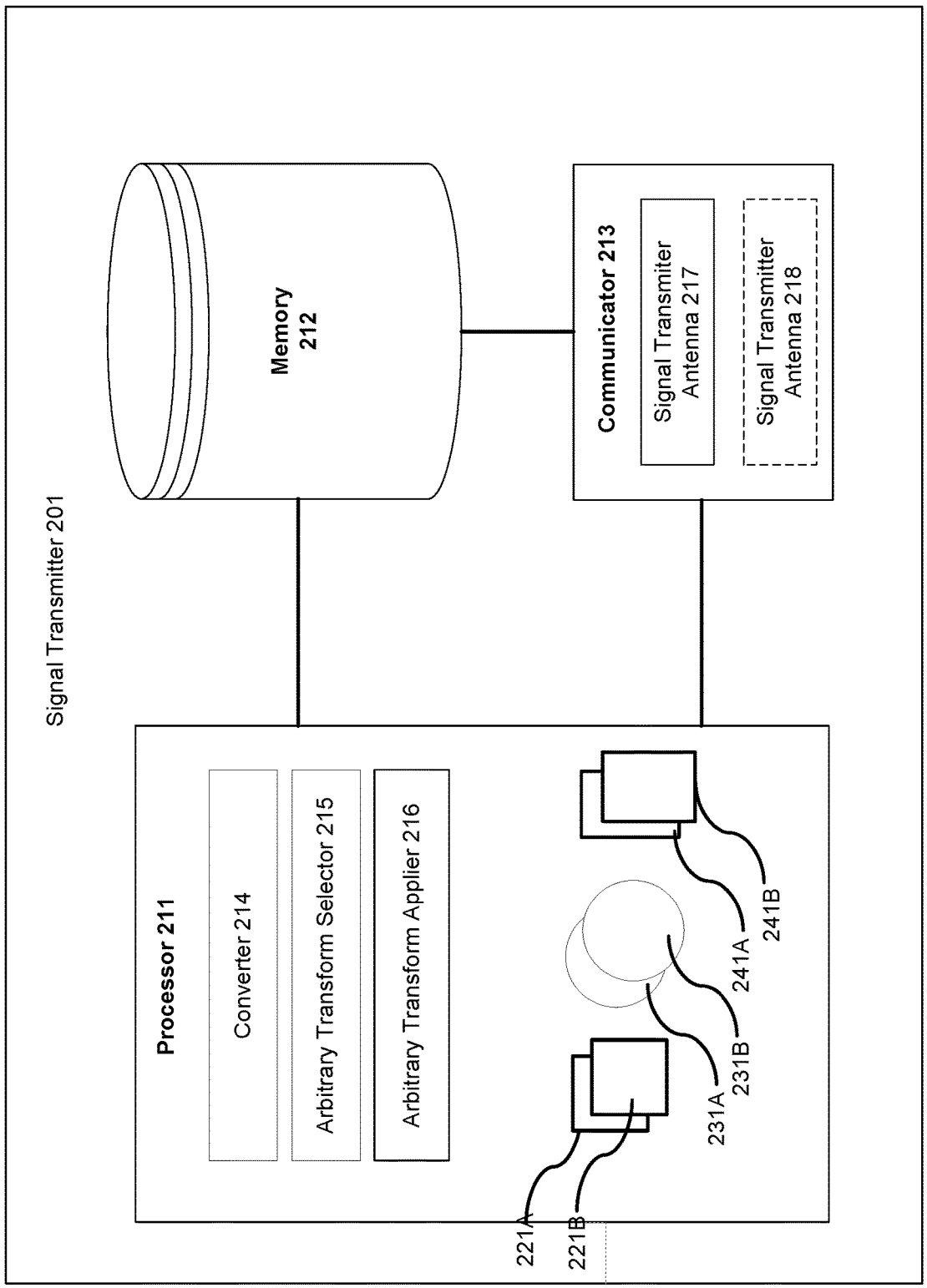
FIG. 2 is a schematic representation of a signal transmitter within a gUBDM system, according to an embodiment.

FIG. 2 is a schematic block diagram of an example signal transmitter 201 that can be a part of an gUBDM system such as the gUBDM system 100 described above with reference to FIG. 1, according to an embodiment. The signal transmitter 201 can be structurally and functionally similar to the signal transmitters 101,102 of the system 100 illustrated in FIG. 1. In some embodiments, the signal transmitter 201 can be, or can include, processors configured to process instructions stored in a memory The signal transmitter 201 can be a hardware-based computing device and/or a multimedia device, such as, for example, a server, a desktop compute device, a smartphone, a tablet, a wearable device, a laptop and/or the like. The signal transmitter 201 includes a processor 211, a memory 212 (e.g., including data storage), and a communicator 213.

The processor 211 can be, for example, a hardware based integrated circuit (IC) or any other suitable processing device configured to run and/or execute a set of instructions or code. For example, the processor 211 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 211 can be operatively coupled to the memory 212 through a system bus (for example, address bus, data bus and/or control bus).

The processor 211 can be configured to receive a signal to be transmitted and to perform processing to transform the signal into a transformed signal by applying an arbitrary transformation. In some implementations, the processor 211 can apply an arbitrary transformation that is defined to be a unitary transformation such that the transformed signal can be transmitted in a secure and efficient manner using the gUBDM system.

The processor 211 can include a set of components including a converter 214, an arbitrary transform selector 215, and an arbitrary transform applier 216. The processor 211 can receive a set of signals 221A, 221B, perform a set of arbitrary transformations 231A, 231B, and send a set of transformed signals 241A, 241B.

In some embodiments, each of the converter 214, an arbitrary transform selector 215, and an arbitrary transform applier 216 can be software stored in the memory 212 and executed by processor 211. For example, each of the above mentioned portions of the processor 211 can be code to cause the processor 211 to execute the converter 214, the arbitrary transform selector 215, and the arbitrary transform applier 216. The code can be stored in the memory 212 and/or a hardware-based device such as, for example, an ASIC, an FPGA, a CPLD, a PLA, a PLC and/or the like. In other embodiments, each of the converter 214, the arbitrary transform selector 215, and the arbitrary transform applier 216 can be hardware configured to perform the respective functions. In some embodiments, each of the components can a combination of software and hardware based. In some embodiments one or more of the components (e.g., converter 214, the arbitrary transform selector 215, the arbitrary transform applier 216) of the processor 211 can be configured to operate based on one or more platforms (e.g., one or more similar or different platforms) that can include one or more types of hardware, software, firmware, operating systems, runtime libraries, and/or so forth. In some implementations, the components of the signal transmitter can be configured to operate within a cluster of devices (e.g., a server farm). In such an implementation, the functionality and processing of the components of the signal transmitter 201 can be distributed to several devices of the cluster of devices. The components of the signal transmitter 201 and signal receiver 301 can be, or can include, any type of hardware and/or software configured to process attributes (shown in FIG. 3).

The converter 214 can be configured to receive a signal to be transmitted and prepare the signal in a form that can be transformed by the processor 211 using an arbitrary transformation. For example, in some embodiments, the processor 211 can receive a signal in the form of a serial set of symbols $b_n$. The converter 214 can be configured to perform a serial-to-parallel computation on the set of symbols $b_n$ to convert the serial set of symbols $b_n$ to a parallel set of symbols. In some embodiments, the converter 214 can generate a plurality of vectors (e.g., vectors 221A and 221B) based on the set of symbols. In some implementations, the converter 214 can receive a signal in the form of a plurality of input bits. The converter 214 can be configured to generate a plurality of symbols based on the plurality of input bits. The converter 214 can be further configured to generate a plurality of blocks based on the plurality of symbols where each block from the plurality of blocks represents a vector from a plurality of vectors (e.g., vectors 221A, 221B). Alternatively, the converter 214 can be further configured to generate multiple pluralities of blocks based on the plurality of symbols where each plurality of blocks from the multiple pluralities of blocks represents a vector from a plurality of vectors (e.g., vectors 221A, 221B).

The arbitrary transform selector 215 can be configured to select, based at least partly on the signal to be transmitted or the plurality of vectors generated by the converter 214, an arbitrary transformation (e.g., arbitrary transformation 231A, 231B) to be applied on the plurality of vectors (e.g., vectors 221A, 221B) to securely and efficiently transmit the vectors from the signal transmitter 201 to one or more receivers associated with the gUBDM system. The arbitrary transformation (e.g., arbitrary transformation 231A, 231B) can include one of, or a combination of any of, a non-linear transformation, a unitary transformation, an ETF transformation, or a NETF transformation. In some embodiments, the arbitrary transform selector 215 can have access to a library of arbitrary transformations that are unitary by design (e.g., arbitrary transformation 231A, 231B) from which one can be selected for transmitting a signal. The arbitrary transform selector 215 can select the arbitrary transformation based, for example, on a transformation type and/or a criteria negotiated between two communicants via a telecommunications handshake or otherwise input by a participant in the communications system. The criteria can include, for example, one or more of: a desired security level, a latency threshold, an error rate threshold, a minimum data rate, a maximum data rate, etc. Notably, unitary transformation is the largest class of transformations that can be performed on a vector of symbols that leaves the total power of the signal unchanged. If a non-unitary transformation is used, then the inverse transformation at the receiver will necessarily amplify noise in some of the received symbols, whereas this is not the case of unitary transformations.

In some instances, the arbitrary transformation selector 215 can be configured to select a transformation that is not an identity matrix, a discrete Fourier matrix, or is any other direct sum of Fourier matrices. For example in some implementations the arbitrary transformations selector 215 can have a library of unitary transformations and based on a set of guidelines select one unitary transformation U and perform computations to check if U is an identity matrix, or a discrete Fourier matrix, or is any other direct sum of a set of Fourier matrices. If U is one of the three above categories, in some embodiments the arbitrary transform selector 215 can discard U and select another transformation that can meet the guideline of not being any of the above three categories. If the arbitrary transformation selector 215 picks a transformation U that is not an identity matrix, a discrete Fourier matrix, or is any other direct sum of Fourier matrices it can then assign U as the arbitrary transformation A to be used for an instance of transforming a signal to be transmitted using a gUBDM system according to that embodiment.

In some implementations, the arbitrary transform selector 215 can perform the selection based on a set of inputs received by the processor 211. In some implementations, the arbitrary transform selector 215 can perform the selection based on a set of parameters associated with the signal, the plurality of vectors, the nature of signal transmission (e.g., a security requirement, sensitivity of information content in the signal, path of signal transmission, etc.). In some implementations, the arbitrary transform selector 215 can be configured to define and generate an arbitrary transformation according a set of inputs received by the processor 211 (e.g., a set of user inputs received by the processor 211).

The arbitrary transform applier 216 can apply the selected arbitrary transformation on the plurality of vectors (e.g., vectors 221A, 221B) to generate a plurality of transformed vectors (e.g., transformed vectors 2411A, 241B). In some implementations, the plurality of transformed vectors can have a total magnitude that substantially equals a total magnitude of the plurality of vectors.

The transformed vectors can then be sent to the signal transmitter antennas 217 and 218 included in the communicator 213 to be sent to one or more signal receivers associated with a signal receiver. In some implementations, for example, the arbitrary transform applier 216 can be configured to perform matrix operations to apply a transformation matrix A on a set of vectors to generate transformed vectors. In some implementations, the arbitrary transform applier 216 can be configured to perform any suitable number of procedures (e.g. signal processing procedures, suitable matrix operations) on a set of vectors before applying an arbitrary transformation.

While illustrated to include two signal transmitter antennas 217 and 218, as described above, a similar signal transmitter could include a single transmitter antenna according to some embodiments. A similar signal transmitter could include any suitable higher number of signal transmitter antennas (i.e., more than two transmitter antennas) according to still other embodiments. In some embodiments the signal transmitter 201 can include a plurality of antenna arrays configured to perform Multiple Input Multiple Output (MIMO) operations.

The memory 212 of the signal transmitter 201 can be, for example, a random access memory (RAM), a memory buffer, a hard drive, a read-only memory (ROM), an erasable programmable read-only memory (EPROM), and/or the like. The memory 212 can store, for example, one or more software modules and/or code that can include instructions to cause the processor 211 to perform one or more processes, functions, and/or the like (e.g., functions associated with the converter 214, the arbitrary transform selector 215, the arbitrary transform applier 216). In some embodiments, the memory 212 can include extendable storage units that can be added and used incrementally. In some implementations, the memory 212 can be a portable memory (for example, a flash drive, a portable hard disk, and/or the like) that can be operatively coupled to the processor 211. In other instances, a memory can be remotely operatively coupled with the signal transmitter 201. For example, a remote database server can serve as a memory and be operatively coupled to the signal transmitter 201.

The communicator 213 can be a hardware device operatively coupled to the processor 211 and memory 212 and/or software stored in the memory 212 executed by the processor 211. The communicator 213 can include a signal transmitter antenna 217 and optionally a signal transmitter antenna 218. While a second transmitter antenna 218 in addition to the transmitter 217 is shown in FIG. 2, a signal transmitter similar to the signal transmitter 201 can have any number of transmitter antennas, according to some embodiments, or just a single signal transmitter antenna, according to some other embodiments. The communicator 213 can be, for example, a network interface card (NIC), a Wi-Fi™ module, a Bluetooth® module and/or any other suitable wired and/or wireless communication device. Furthermore the communicator 213 can include a switch, a router, a hub and/or any other network device. The communicator 213 can be configured to connect the compute device 201 to a communication network (such as the communication network 106 shown in FIG. 1). In some instances, the communicator 213 can be configured to connect, via one or more communication channels, to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 213 can facilitate receiving and/or transmitting a file and/or a set of files via one or more communication channels through a communication network (e.g., the communication network 106 in the gUBDM system 100 of FIG. 1). In some instances, a received file can be processed by the processor 211 and/or stored in the memory 212 as described in further detail herein. In some instances, as described previously, the communicator 213 can be configured to send a plurality of transformed vectors, via the signal transmitter antennas 217 and 218, to one or more signal receiver antennas associated with one or more signal receivers connected to a communication network as part of a gUBDM system. The communicator 213 can also be configured to send and/or receive data associated with a library of arbitrary transformation systems.

Figure 3:
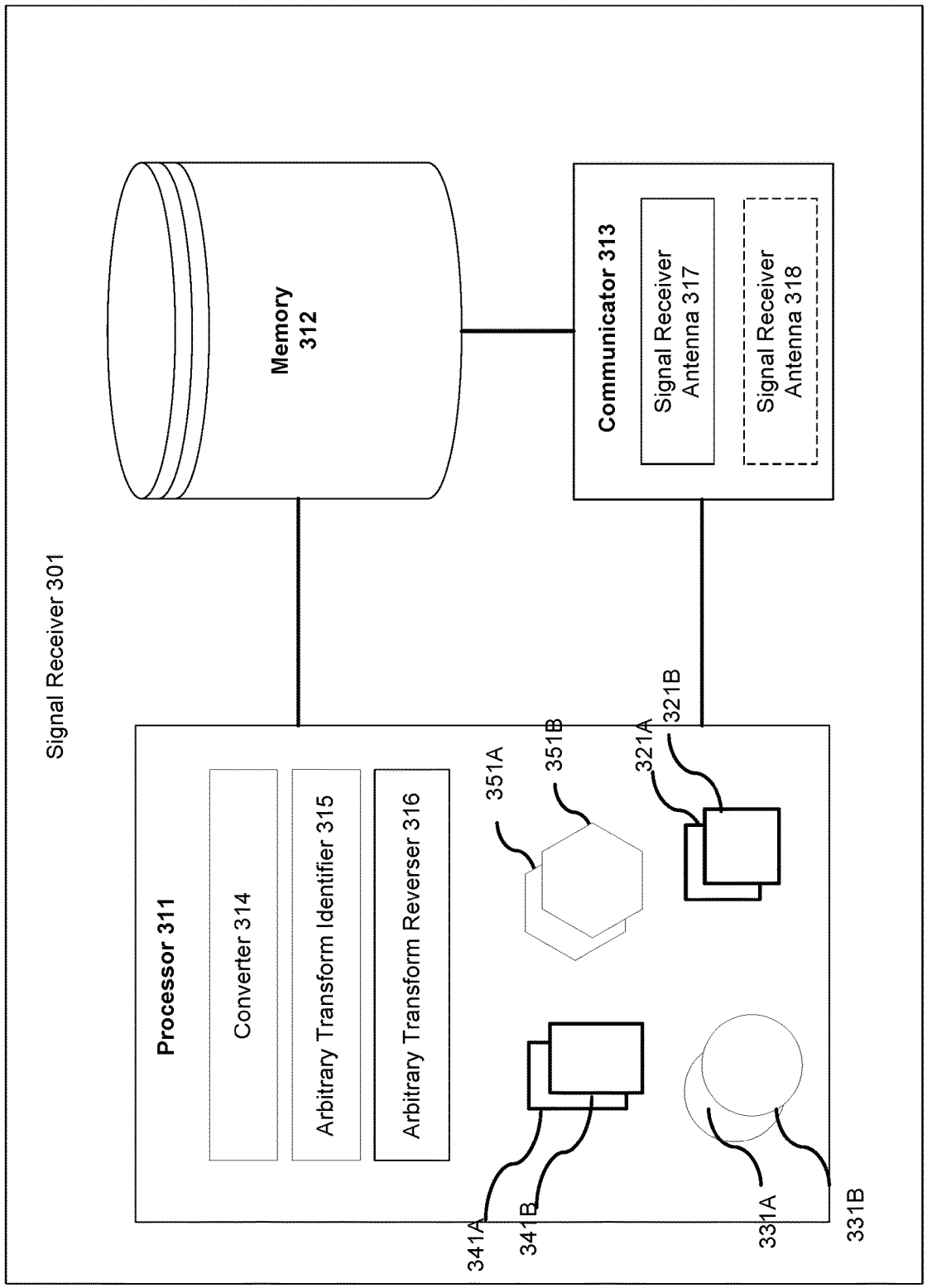
FIG. 3 is a schematic representation of a signal receiver within a gUBDM system, according to an embodiment

Returning to FIG. 1, the signal transmitters 101,102 that are connected to gUBDM system 100 can be configured to communicate with and transmit signals to signal receivers 103, 104 via one or more communication channels defined in the communication network 106. FIG. 3 is a schematic representation of a signal receiver 301 that is part of gUBDM system. The signal receiver 301 can be structurally and functionally similar to the signal receivers 103, 104 of the system 100 illustrated in FIG. 1. The signal receiver 301 includes a processor 311, a memory 312, and a communicator 313.

The processor 311 can be, for example, a hardware based integrated circuit (IC) or any other suitable processing device configured to run and/or execute a set of instructions or code. For example, the processor 311 can be a general purpose processor, a central processing unit (CPU), an accelerated processing unit (APU), an application specific integrated circuit (ASIC), a digital signal processor (DSP), a field programmable gate array (FPGA), a programmable logic array (PLA), a complex programmable logic device (CPLD), a programmable logic controller (PLC) and/or the like. The processor 311 can be operatively coupled to the memory 312 through a system bus (for example, address bus, data bus and/or control bus).

The processor 311 can be configured to receive a transformed signal that is securely transmitted via one or more communication channels defined in a communication network (e.g., network 106 of FIG. 1), obtain information associated with an arbitrary transformation that was used to generate the transformed signal, and based on the information process the transformed signal to recover an original signal (e.g., by applying an inverse of the arbitrary transformation) such that the original signal can be received by a destination in a secure and efficient manner using the gUBDM system, according to an embodiment.

The processor 311 can include a set of components including a converter 314, an arbitrary transform identifier 315, and an arbitrary transform reverser 316. The processor 311 can include, or access from memory 312, a plurality of transformed vectors 341A, 341B, representing transformed signals, received from one or more transmitter antennas of a signal transmitter (e.g., transmitter antennas 217 and 218 of signal transmitter 201) that is part of the gUBDM system that the signal receiver 301 is part of. The processor 311 can include or access in memory 312 a set of arbitrary transformations 331A and 331B, identified based on information associated with a signal received from a signal transmitter, and a set of reverse transformations 351A, 351B, computed based on the identified arbitrary transformations, and a plurality of vectors 321A, 321B representing a set of original signals.

The arbitrary transform identifier 315 can be configured to receive information associated with a transformed signal (e.g., transformed signal represented by transformed vectors 341A, 341B) received via the signal receivers 317 and 318, the information including an indication of the identity of an arbitrary transformation that was used in generating the transformed signals. The arbitrary transform identifier 315 is configured to, based on the information, identify the arbitrary transformation that can be used to recover an original signal (e.g., original signal represented by plurality of vectors 321A, 321B) from the transformed signal (e.g., transformed signals 341A, 341B).

The arbitrary transform reverser 316 generates, based on the identity of the arbitrary transformation, an inverse of the identified arbitrary transformation, also referred to as a reverse transformation (e.g., reverse transformations 351A, 351B) configured to reverse the effects of the identified arbitrary transformation to recover the original signal from a transformed signal. For example, in some embodiments, the arbitrary transform reverser 316 generates a reverse transformation (A') 351A configured to be applied on a plurality of transformed vectors 341A and 341B, representing a transformed signal, and received by the signal receiver 301, so that the reverse transformation (A') 351A can reverse the effects of an arbitrary transformation (A) 331A and recover a plurality of vectors 321A and 321B representing an original signal.

The converter 314 can be configured to receive a recovered plurality of vectors (e.g., 321A and 321B) representing an original signal and regenerate the original signal from the recovered plurality of vectors. For example, in some embodiments, the processor can receive a parallel set of symbols $b_n$. The converter 314 can be configured to perform a parallel-to-serial computation on the set of symbols $b_n$ to convert the parallel set of symbols $b_n$ to a serial set of symbols that can be similar to the original signal. In some embodiments, the converter 314 can receive a plurality of recovered vectors (e.g., vectors 321A and 321B) and generate, based on the vectors, an original signal including a set of symbols. In some embodiments, the converter 314 can receive a plurality of recovered vectors (e.g., vectors 321A and 321B) and generate, based on the recovered vectors pluralities of blocks each plurality of blocks representing a vector of the plurality of vectors. The converter 314 can then regenerate, based on the pluralities of blocks, a plurality of input bits from which it can recover an original signal.

The memory 312 of the signal receiver 301 can be similar in structure and/or function to the memory 212 of the signal transmitter 201. For example, the memory 312 can be a random access memory (RAM), a memory buffer, a hard drive, a read-only memory (ROM), an erasable programmable read-only memory (EPROM), and/or the like. The memory 312 can store, for example, one or more software modules and/or code that can include instructions to cause the processor 311 to perform one or more processes, functions, and/or the like (e.g., functions associated with the converter 314, the arbitrary transform identifier 315, the arbitrary transform reverser 316). In some embodiments, the memory 312 can include extendable storage units that can be added and used incrementally. In some implementations, the memory 312 can be a portable memory (for example, a flash drive, a portable hard disk, and/or the like) that can be operatively coupled to the processor 311. In other instances, the memory can be remotely operatively coupled with the signal receiver 301. For example, a remote database server can serve as a memory and be operatively coupled to the signal receiver 301.

The communicator 313 can be a hardware device operatively coupled to the processor 311 and memory 312 and/or software stored in the memory 312 executed by the processor 311. The communicator 313 can include a signal receiver antenna 317 and optionally a signal receiver antenna 318. While a second receiver 318 in addition to the receiver 317 is shown in FIG. 3, a signal receiver similar to the signal receiver 301 can have any number of receivers, according to some embodiments, or just a single signal receiver, according to some other embodiments. The communicator 313 can be, for example, a network interface card (NIC), a Wi-Fi™ module, a Bluetooth® module and/or any other suitable wired and/or wireless communication device. Furthermore the communicator 313 can include a switch, a router, a hub and/or any other network device. The communicator 313 can be configured to connect the signal receiver 301 to a communication network (such as the communication network 106 shown in FIG. 1). In some instances, the communicator 313 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 313 can facilitate receiving and/or transmitting a file and/or a set of files via one or more communication channels defined in a communication network (e.g., the communication network 106 in the gUBDM system 100 of FIG. 1). In some instances, a received file can be processed by the processor 311 and/or stored in the memory 312 as described in further detail herein. In some instances, as described previously, the communicator 313 can be configured such that the signal receivers 317 and 318 include one or more antennas tuned to receive transformed signals of a particular predetermined center frequency within a predetermined bandwidth, to receive transformed signals securely and efficiently transmitted by one or more signal transmitter antennas associated with one or more signal transmitters connected to a communication network as part of a gUBDM system. The communicator 313 can also be configured to send and/or receive data associated with a library of arbitrary transformation systems. In some embodiments the signal receiver 301 can include a plurality of antenna arrays configured to perform Multiple Input Multiple Output (MIMO) operations.

Figure 4A:
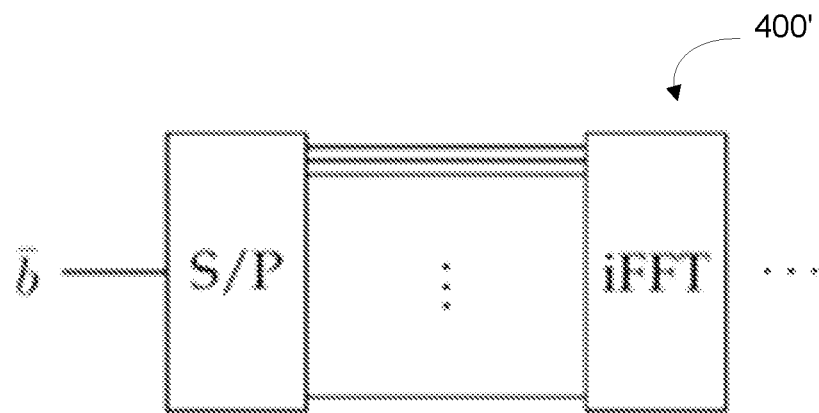
FIG. 4A is a schematic representation of a processing of a signal at a signal transmitter of an OFDM system.

In some embodiments, the gUBDM system (e.g., gUBDM system 100) can be in some aspects partly similar in structure and/or function to an Orthogonal Frequency Divisional Multiplexing (OFDM) system. For example, an example pipeline for an OFDM system 400' can include a set of operations as presented in FIG. 4A, where vector b can be a set of symbols $b_n$.

In the example OFDM system 400', the symbols $b_n$ enter an OFDM transmitter and are first put through a "serial-to-parallel" (labeled "S/P" above) computation, and then they are run through an inverse FFT (labeled "iFFT" above). In some embodiments, they may be given a cyclic prefix, and undergo a pulse shaping procedure. An OFDM receiver can be configured to perform the above operations in a reverse order, except an FFT replaces the iFFT.

Figure 4B:
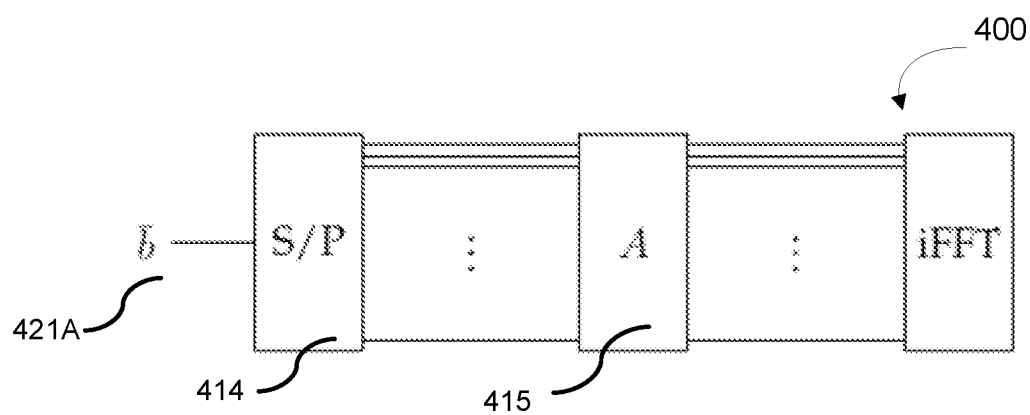
FIG. 4B is a schematic representation of a processing of a signal at a signal transmitter of a gUBDM system, according to an embodiment.

Compared to the above described OFDM system 400', operations carried out by a gUBDM system 400 described herein (e.g., gUBDM system 100) are illustrated in FIG. 4B. The gUBDM 400 can include an extra operator (e.g., a linear operator) A between the S/P block 414 and the iFFT block, as shown in FIG. 4B. In use, according to the example embodiment associated with FIG. 4B, the gUBDM 400 operates such that symbols $b_n$ are received by the signal transmitter and are first put through a serial-to-parallel block (e.g., converter similar to converter 214 of the signal transmitter 201) to generate a converted set of vectors. The converted set of vectors then undergo the linear transformation A to generate a set of transformed vectors. For example, the transformation can be carried out by an arbitrary transformation applier 415 similar to arbitrary transformation applier 216 and the linear transformation A being selected by arbitrary transformation selector similar to the arbitrary transformation selector 215. In some embodiments, the transformed vectors are then put through an iFFT block to generate a second transformed vectors and the resulting second transformed vectors can be transmitted to one or more receivers in the gUBDM system. In some other embodiments, the iFFT block can be skipped and the transformed vectors generated by the arbitrary transformation applier can be transmitted to one or more receivers in the gUBDM system. Expressed in another way, $$\bar{b} \to A\bar{b} \to \bar{s} = \mathcal{F}A\bar{b}.$$

Figure 4C:
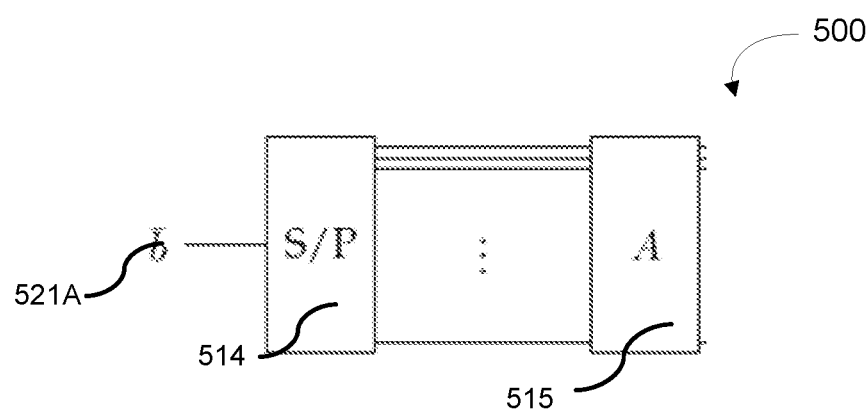
FIG. 4C is a schematic representation of a processing of a signal at a signal transmitter of a gUBDM system, according to an embodiment

(where $\mathcal{F}$ is the discrete Fourier matrix). In some embodiments, A can be unitary by design, as described herein, and F is known to be unitary. By property of unitary matrices as a group, the product FA will also be unitary. Therefore, because A can be any unitary, including the iFFT matrix is unnecessary, and according to some embodiments a gUBDM system can be configured by replacing the iFFT block with an arbitrary unitary A, as illustrated in FIG. 4C showing the operations in a gUBDM system 500, including an arbitrary transform applier 515, according to an embodiment.

Following the above description a signal transmitter and a signal receiver operable with an OFDM system (e.g., OFDM system 400 of FIG. 4A) can be easily adapted to be used with a gUBDM system described herein (e.g., gUBDM systems 400 and 500 in FIGS. 4B and 4C) with the only changes being a replacement of an iFFT operation with an arbitrary transformation operation using A at the transmitter and the FFT with A' at the signal receiver to reverse the transformation. Other details of an OFDM system can remain.

The above described gUBDM system, in use, can be used to transmit signal in a highly secure and efficient manner as described in detail below. Given a signal transmission system, where one or more signals are transmitted from a source associated with a user Alice to a destination associated with a user Bob, such a system may be vulnerable to eavesdropping by a third party user Eve who may have access to the transmitted signal or transmitted vectors. Given that a gUBDM system is being used for the signal transmission, where an arbitrary transformation A is used to generate the transformed signal or transformed vectors that are being transmitted, if Eve doesn't know the matrix A and is only able to base her attack on knowing cipher, the amount of work she has to do to recover the data can be prohibitively large. In some other embodiments, the arbitrary transformation can be non-linear in nature, making it even more complicated and infeasible for Eve to find the non-linear transformation to recover signals even if she has access to plaintext/ciphertext pairs.

Figure 5:
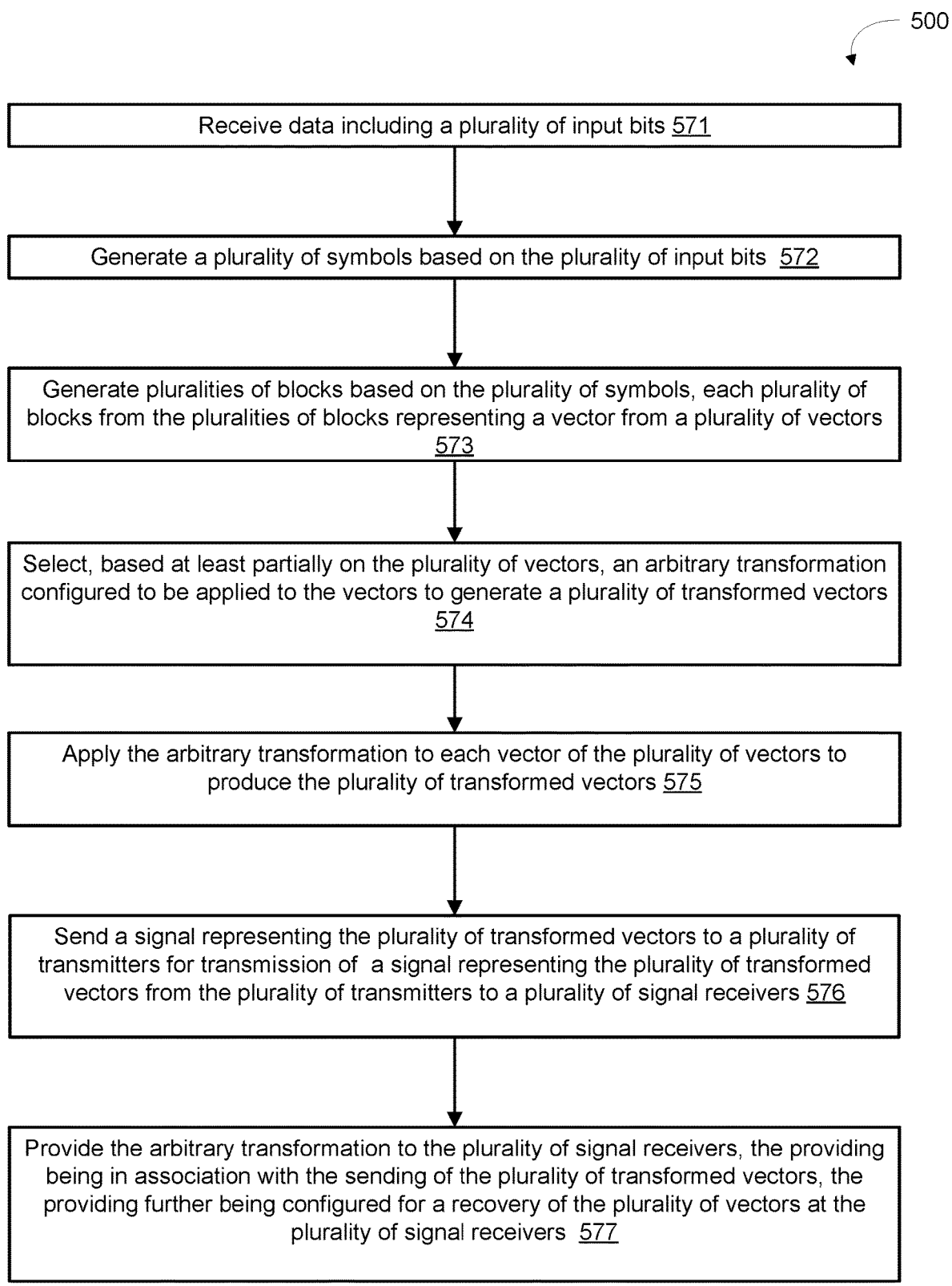
FIG. 5 is a flowchart describing a method of processing and transmitting a signal using a gUBDM system, according to an embodiment.

FIG. 5 illustrates a flowchart describing an example method 500 of preparing a signal and transmitting a signal in a secure and efficient manner using a gUBDM system, according to an embodiment. At 571, according to the method 500, a signal transmitter of a gUBDM system (e.g., the signal transmitter 201 described above) receives data including a plurality of input bits. The plurality of input bits can represent an original signal that is to be transmitted in a secure and efficient manner. The data can further include other attributes associated with the signal represented by the input bits. For example the data can include information related to the nature of the signal, the nature of the input bits, the size, sensitivity of the information contained, security requirement, etc.

At 572, the signal transmitter generates a plurality of symbols based on the plurality of input bits. In some instances, the signal transmitter can generate a plurality of symbols with a symbol being described as a pulse in a digital complex baseband signal. In some implementations, a symbol can be a waveform, or a state that, when transmitted through a communication channel defined in a communications network, can change/alter and/or maintain a state or a significant condition of the communication channel such that the state or condition persists, for a fixed period of time. In some instances, a signal transmitter can break up a plurality of input bits associated with a serial signal into a plurality of symbols that can be modified and/or transmitted in parallel using a Multiple Input and Multiple Output system of transmission as described further below. In some instances, a signal transmitter can use a converter (e.g., converter 214) to convert a serial plurality of input bits into a parallel plurality of symbols. In some implementations, the generating a plurality of symbols based on a plurality of input bits can be via using a bit-to-symbol map.

At 573, the signal transmitter generates pluralities of blocks based on the plurality of symbols, each plurality of blocks from the pluralities of blocks representing a vector from a plurality of vectors. In some instances, a signal transmitter can receive a serial plurality of symbols associated with a serial signal and break it up into pluralities of blocks each plurality of block representing a vector from a plurality of vectors, the vectors being configured to be transformed and/or transmitted in parallel using a Multiple Input and Multiple Output system of transmission as described herein. In some instances, a signal transmitter can use a converter (e.g., converter 214) to convert the serial plurality of symbols into the pluralities of blocks.

At 574, the signal transmitter select, based at least partially on the plurality of vectors, an arbitrary transformation configured to be applied to the vectors to generate a plurality of transformed vectors. For example, the signal transmitter can have access to a library of arbitrary Transformations including unitary transformations, equiangular tight frame (ETF) transformations, and a nearly equiangular tight frame (NETF) transformations. The signal transmitter can use an arbitrary transformation selector (e.g., arbitrary transformation selector 215) to select arbitrary transformation, for example a unitary transformation, to be applied on the plurality of vectors to generate a plurality of transformed vectors. In some instances, the arbitrary transformation can select an equiangular tight frame (ETF) transformation, or in some other instances the arbitrary transformation selector can select a nearly equiangular tight frame (NETF) transformation. In some implementations, the arbitrary transformation selector can be configured such that the arbitrary transformation selected is based on a matrix that is not an identity matrix or a discrete Fourier matrix. In some implementations, the arbitrary transformation selector can be configured such that the arbitrary transformation selected is based on a matrix that is not a direct sum of discrete Fourier matrices.

At 575, the signal transmitter applies the arbitrary transformation to each vector of the plurality of vectors to produce the plurality of transformed vectors. In some instances, the applying the arbitrary transformation can be such that the plurality of transformed vectors has a total magnitude that substantially equals a total magnitude of the plurality of vectors.

At 576, the signal transmitter sends a signal representing the plurality of transformed vectors to a plurality of transmitter antennas for transmission of a signal representing the plurality of transformed vectors from the plurality of transmitter antennas to a plurality of signal receivers. In some instances, the plurality of transformed vectors can be configured to be sent in parallel via multiple transmitter antennas associated with the signal transmitter antenna device (e.g., transmitter antennas 217 and 218 associated with the signal transmitter 201) and through multiple communication channels using a Multiple Input and Multiple Output system of transmission such that the transformed vectors sent in parallel can be received by a plurality of receivers associated with one or more signal receivers associated with the gUBDM system being used. For example, the plurality of signal receivers can include a plurality of antenna arrays, and the plurality of signal receivers be associated with signal receivers such as the signal receiver 301 and the plurality of signal transmitter antennas can be associated with signal transmitters such as the signal transmitter 201, where in the signal transmitter and the signal receiver are configured to perform Multiple Input Multiple Output (MIMO) operations.

In some implementations, the signal can include a set of transformed symbols associated with the plurality of transformed vectors and a signal transmitter (e.g., signal transmitter 201) can place a set of transformed symbols on the communication channel (s) (e.g., via a transmitter 217) at a fixed and known symbol rate. A signal receiver can perform the task of detecting the sequence of transformed symbols to reconstruct the transformed vectors. In some instances, there may be a direct correspondence between a transformed symbol and a small unit of data. For example, each transformed symbol may encode one or several binary digits or 'bits'. The data may also be represented by the transitions between transformed symbols, or even by a sequence of many transformed symbols.

In some implementations, the signal transmitter can be configured to send the signal representing the plurality of transformed vectors to the plurality of transmitters via a physical layer associated with an open system interconnection model (OSI). The OSI model is a conceptual model that characterizes and standardizes the communication functions of a telecommunication or computing system without regard to its underlying internal structure and technology with the goal of achieving interoperability of diverse communication systems using standard communication protocols. The OSI model uses partitioning of information exchanged via communication channels of a communication network into abstraction layers (e.g., seven layers) with each layer including information of a specific type.

For example, a layer 1 can include a physical layer used for the transmission and reception of unstructured raw data between a signal transmitter and a physical transmission medium (e.g., a wireless communication channel in a communication network such as network 106). It is configured to convert digital bits included in the signals transmitted into electrical, radio, or optical signals. Layer specifications define characteristics such as voltage levels, the timing of voltage changes, physical data rates, maximum transmission distances, modulation scheme, channel access method and physical connectors. This includes the layout of pins, voltages, line impedance, cable specifications, signal timing and frequency for wireless devices. Bit rate control is done at the physical layer and may define transmission mode as simplex, half duplex, and full duplex. The components of a physical layer can be described in terms of a network topology. The communications channel used to transmit the signal can have specifications for a physical layer.

At 577, the signal transmitter provides the arbitrary transformation to the plurality of signal receivers, the providing being in association with the sending of the plurality of transformed vectors, the providing further being configured for a recovery of the plurality of vectors at the plurality of signal receivers. In some implementations, the plurality of signal receivers is further configured to transmit a signal representing the plurality of transformed vectors to a target device. For example the plurality of signal receivers can be associated with one or more signal receivers that can be configured to transmit a signal representing the plurality of transformed vectors to a target device.

In some instances, the signal transmitter can send a signal that, in addition to representing the plurality of transformed vectors, can also be representing one of: (1) the arbitrary transformation, or (2) an inverse of the arbitrary transformation to the plurality of signal receivers. In some instances, the signal transmitter can send a first signal representing the plurality of transformed vectors and send a second signal representing the arbitrary transformation or an inverse of the arbitrary transformation. In some implementations the signal transmitter can send the second signal at a time point prior to the sending of the first signal. That is, said in another way, the signal transmitter can send the signal representing the arbitrary transformation or an inverse of the arbitrary Transformation prior to transmission of the signal representing the plurality of transformed vectors to the plurality of signal receivers, such that the plurality of signal receivers recovers the plurality of vectors from the plurality of transformed vectors based on the arbitrary transformation or an inverse of the arbitrary transformation.

Figure 6:
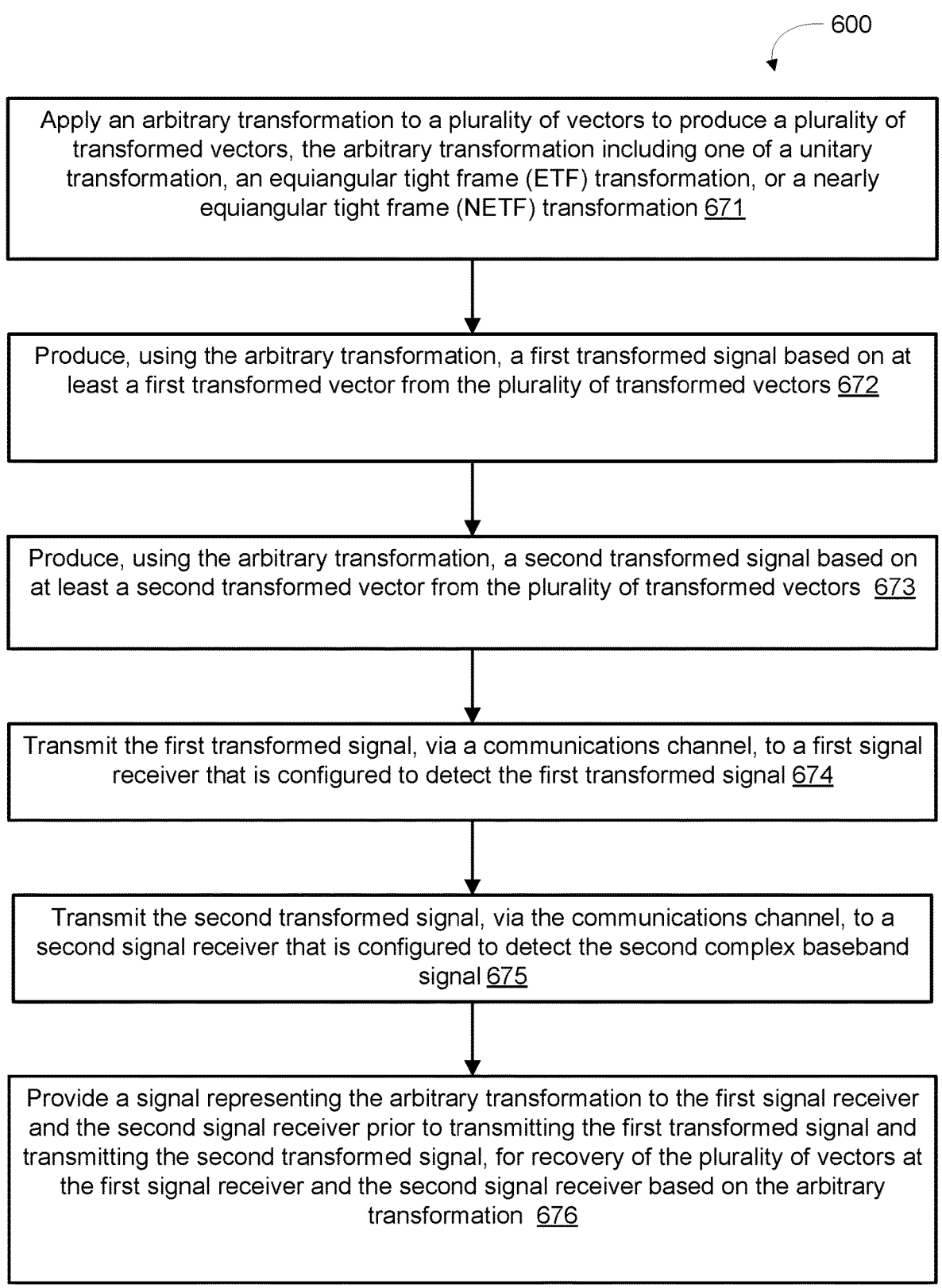
FIG. 6 is a flowchart describing a method of processing and transmitting a signal using a gUBDM system, according to an embodiment

FIG. 6 illustrates an example method 600 of transmitting a signal in a secure and efficient manner, using a gUBDM system according to an embodiment. The method 600 can be implemented by a processor for example a processor associated with a signal transmitter of a gUBDM system (e.g., the signal transmitter 201 described above). At 671, an arbitrary transformation is applied to a plurality of vectors to produce a plurality of transformed vectors. The arbitrary transformation can include a unitary transformation, an equiangular tight frame (ETF) transformation, or a nearly equiangular tight frame (NETF) transformation. In some implementations, more than one arbitrary transformations can be applied. For example in some instances, the signal transmitter implementing the method 600 can be configured such that a first arbitrary transformation is applied to the plurality of vectors to produce a first plurality of transformed vectors and a second arbitrary transformation is applied to the plurality of vectors to produce a second plurality of transformed vectors.

At 672, the method includes producing, using the arbitrary transformation, a first transformed signal based on at least a first transformed vector from the plurality of transformed vectors. In some instances the first transformed signal can include a first complex baseband signal. At 673, the method includes producing, using the arbitrary transformation, a second transformed signal based on at least a second transformed vector from the plurality of transformed vectors. In some instances, the second transformed signal can include a second complex baseband signal.

As described above, in some implementations the second transformed signal can be based on a second transformed vector the second plurality of transformed vectors generated using the second arbitrary transformation.

At 674, the method 600 includes transmitting the first transformed signal, via a communications channel, to a first signal receiver that is configured to detect the first transformed signal. At 675, the method includes transmitting the second transformed signal, via the communications channel, to a second signal receiver that is configured to detect the second complex baseband signal. In some instances, the transmitting the second transformed signal is via a second communications channel different from the first communications channel.

At 676, the method includes providing a signal representing the arbitrary transformation to the first signal receiver and the second signal receiver in association with the transmitting the first transformed signal and the transmitting the second transformed signal, for recovery of the plurality of vectors at the first signal receiver and the second signal receiver based on the arbitrary transformation. In some instances, the providing the signal representing the arbitrary transformation is done prior to transmitting the first transformed signal and the transmitting the second transformed signal. In some other instances, the providing the signal representing the arbitrary transformation can be done after the transmitting the first transformed signal and the transmitting the second transformed signal, in which case the signal receivers can store the transformed signal(s) received and recover the original signals at a later point in time after receiving the signal representing the arbitrary transformation. In some instances, the signal receivers can be configured to transmit a transformed signal to a target device. For example, the signal receivers can be configured to transmit a signal representing the plurality of transformed vectors to a designated target device.

As described above, in some instances where a first arbitrary transformation is used to produce the first plurality of transformed vectors and a second arbitrary transformation is used to the second plurality of transformed vectors, the providing a signal representing the arbitrary transformation can include providing a first signal representing the first arbitrary transformation and providing a second signal representing the second arbitrary transformation. In some implementations, the transmitting the first transformed signal and the providing the first signal representing the first arbitrary transformation can be to a first receiver associated with a first receiver, and the transmitting the second transformed signal produced using the second arbitrary transformation and the providing the second signal representing the second arbitrary transformation can be to a second receiver antenna associated with a second receiver different from the first receiver. In some instances, the first and second signals representing the first and second arbitrary transformations can be broadcast together to a wide audience including the first and second signal receivers. In some instances the first signal representing the arbitrary transformation can be broadcast widely but not the second signal representing the arbitrary transformation, such that the first signal receiver is able to recover the first plurality of vectors but the second receiver is unable to recover the second plurality of transformed vectors until the second signal representing the second arbitrary transformation is provided or broadcast.

While described as a variation of an OFDM system, some embodiments of a gUBDM system operate as a variation of a DSSS system wherein a "code map" is used and is bandwidth limited. The explicit form, as given in the '839 patent referred to above, is $$\bar{c}: \mathbb{C}^N \to \mathbb{C}^M$$

$$\bar{v} \to \bar{c}(\bar{v}), \tag{33}$$

where the $m^{th}$ component of $\bar{c}(\bar{v}) \in \mathbb{C}^M$ is given by $$[\bar{c}(\bar{v})]_m = \sum_{n=1}^{N} v_n e^{-2\pi i \kappa_n (\frac{m}{M} - \frac{1}{2})}. \tag{34}$$

Here, $v_n$ is the $n^{th}$ component of $\bar{v}$, the $\kappa$s are a set of N distinct numbers satisfying $$\kappa_n - \kappa_m \in \mathbb{Z} \ \forall m, n, \tag{35}$$

and M is an integer chosen so that $M > 2 \max_n |\kappa_n|$. This map has the properties discussed above (band-limited and dot-product preserving). Typically, $M \approx N$ if the $\kappa$ are sequential integers centered around 0.

So, to create a maximal set of mutually orthogonal spreading codes, a unitary matrix $A \in U(N)$ is chosen. If the $n^{th}$ column is denoted (or row, doesn't matter which as long as there is consistency) of A as $\bar{A}_n$, then the N codes are $\bar{c}(\bar{A}_n)$ for $n \in [1, \ldots, N]$.

If one device is to transmit data on all N codes, then it will be able to take the N symbols $b_n$, multiply each one by every component of its spreading code, and then add the resulting vectors together. So the transmitted vector $\bar{s}$ is $$\bar{s} = \sum_{n=1}^{N} b_n \bar{c}(\bar{A}_n), \tag{36}$$

where $b_n$ are the symbols.

But to do this, the transmitter multiplies a symbol $b\_n \in \mathbb{C}$ which is typically a complex number (a float, double, etc), times all $M \approx N$ components of $\bar{c}(\bar{A}\_n)$. This is repeated for all N symbols $b\_n$. So, there are N symbols, each being multiplied by N components of the code. This makes the complexity $O[(N]^2)$, which is prohibitive for wide-band applications. (Compare to OFDM, which is $O(N \log N)$.)

Notably for multiple access applications, where each user is given a subset of the codes, they only have to do $O(N)$ work, which is better than OFDM. That makes the DSSS implementation very good for multiple access applications.

To obtain a UBDM that is $O(N \log N)$, to match OFDM reinterpret (0.0.4). The transmitted baud is $$[\bar{s}]_m = \sum_{n=1}^{N} b_n [\bar{c}(\bar{A}_n)]_m \tag{37}$$

$$= \sum_{n=1}^{N} b_n \sum_{k=1}^{N} A_{nk} e^{-2\pi i \kappa_k (\frac{m}{M} - \frac{1}{2})}$$

$$= \sum_{k=1}^{N} \left( \sum_{n=1}^{N} b_n A_{nk} \right) e^{-2\pi i \kappa_k (\frac{m}{M} - \frac{1}{2})}$$

$$= \sum_{k=1}^{N} \tilde{b}_k e^{-2\pi i \kappa_k (\frac{m}{M} - \frac{1}{2})}$$

This can be interpreted (up to normalization) as a discrete Fourier transform of the symbols $$\tilde{b}_k = \sum_{n=1}^{N} b_n A_{nk}. \tag{38}$$

Figure 7:
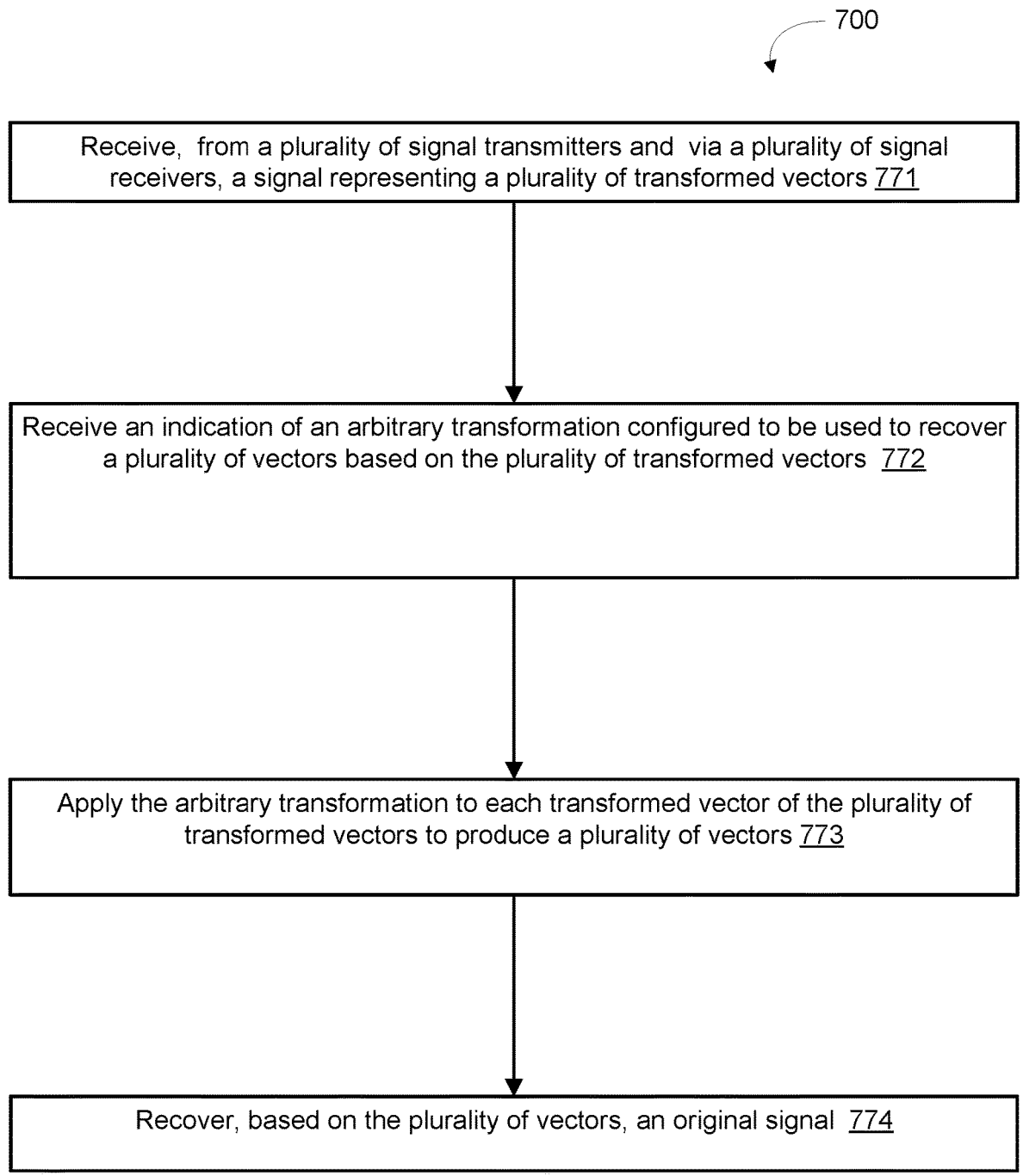
FIG. 7 is a flowchart describing a method of receiving and recovering a signal using a gUBDM system, according to an embodiment.

FIG. 7 is a flowchart describing an example method for a reception of a plurality of transformed vectors and recovery of a plurality of vectors, using a gUBDM system according to an embodiment. The method 700 can be implemented by a processor associated with a signal receiver (e.g., signal receiver 301) described herein.

At 771, the method 700 includes receiving from a plurality of signal transmitters and via a plurality of signal receivers, a signal representing a plurality of transformed vectors.

At 772, the method includes receiving an indication of an arbitrary transformation configured to be used to recover a plurality of vectors based on the plurality of transformed vectors. In some implementations, the receiving the indication of the arbitrary transformation can be from the plurality of signal transmitters and via the plurality of signal receivers. In some instances the receiving the indication of the arbitrary transformation can be prior to the receiving the signal representing a plurality of transformed vectors. In some instances the indication can include an inverse of the arbitrary transformation.

At 773, the method includes applying the arbitrary transformation to each transformed vector of the plurality of transformed vectors to produce a plurality of vectors. At 774, the method includes recovering, based on the plurality of vectors, an original signal. In some instances for example the recovering the original signal can be performed by a converter (e.g., converter 314) associated with a signal receiver. In some instances the method 700 can skip the recovering the original signal at 773 and instead store or send the plurality of vectors to another device to perform the recovering of the original signal.

Another advantage of the above described gUBDM system is that it is designed to take full advantage of the richness and structure of the unitary groups. One opportunity the gUBDM system described affords is the ability to incorporate ETF/NETFs into an adopted and modified OFDM system variation—this is something that is impossible in an OFDM system otherwise unmodified.

The gUBDM system also affords a signal transmission source the ability to include code division multiplexing into an OFDM system upon modification into a gUBDM system. This means that in addition to time division, frequency division, and spatial multiplexing, code division multiplexing can be performed. This adds an enormous degree of freedom for system engineers.

It should be noted that an iFFT will still be likely performed after applying a general unitary A, in some implementations, which can make equalization easier. So, take a data vector b and send it through the steps b→Ab→FAb, where F is a Fourier transformation. However, because of the group structure of U(N), it is known that if F and A are both elements of U(N) are used, then their product will be as well. Because we are using the entire group U(N), there is no difference between claiming a single matrix A and claiming a single matrix A followed by a Fourier matrix. No matter how many unitary matrices we multiplied together, the result is still just another element of U(N).

In other words, a key advantage of this approach is the security. If the act of modulating the data is able, by itself, to fully secure the content to an eavesdropper on that channel, denying her access to the bits (or anything above OSI layer 1), then the attack surface for the eavesdropper has changed radically. All possibilities of traffic analysis attacks, protocol weakness attacks, control data leakage attacks, etc. are completely eliminated. Furthermore, in networks where the security provided by traditional encryption causes delay/latency that adversely impacts the network, the encryption (usually at OSI layer 3 or higher) can be optionally completely removed. This eliminates the space, power, heat, or time to include the encryption, as well as the overhead usually associated with encryption. Furthermore, the delays/latency associated with encryption (everything from simply having to pass the information up and down the OSI stack to the latency associated with simply having to run those bits through the cryptologic) can be eliminated. All the system needs to do is transmit. The modulation itself takes care of the security.

The signal receiver is open to any computation upon receiving the transformed signal. In some implementations, the signal receiver can simply demodulate the signal and recover the symbols and bits. In some implementations, the signal receiver may also want to store the digitized I and Q, or pass the digitized I and Q on to some other system without applying the inverse of the unitary matrix.

UBDM with Physical Layer Security (PLS)

"Physical Layer Security" (PLS) refers to the leveraging of physical properties of a communications channel between users of a communications system for the purposes of exchanging secret information. Although some of the foregoing gUBDM embodiments describe the application of security at the physical layer, they do not, in a strict sense, incorporate PLS, which involves the exploitation of a physical property of the shared channel between two users. For example, in PLS, users generate a secret key for a symmetric cryptologic/security scheme (e.g., Advanced Encryption Standard (AES)), based on the physical properties of a communications channel, for the secret information. Unless an eavesdropper has a receiver that is sufficiently close to one of the users to directly measure (or to gather sufficient information to approximate) the physical properties of the communications channel, the eavesdropper will be unable to access the shared secret. According to embodiments set forth below, PLS can be implemented in combination with gUBDM (or non-generalized UBDM), OFDM, or any other communication system, to enhance security of the communications.

In some embodiments, a communication method combines UBDM or OFDM with PLS. The PLS can include, for example, a modified version of a PLS key exchange algorithm referred to as a MIMO-OFDM Precoding with Rotation (MOPRO) algorithm. Additional details regarding a predecessor version of MOPRO can be found in "Practical Physical Layer Security Schemes for MIMO-OFDM Systems Using Precoding Matrix Indices" by Wu, Lan, Yeh, Lee, and Cheng, published in IEEE Journal on Selected Areas in Communications (Vol 31 Issue 9, September 2013), the entire contents of which are herein incorporated by reference in their entirety for all purposes.

In some embodiments, the MOPRO algorithm relies on having a MIMO system. When a non-MOPRO MIMO-OFDM system initiates a communication link, the system can first measure the MIMO channel, which may be represented by a large matrix of complex values. A first user sends, via a first processor, a representation of a synchronization baud (i.e., a unique word within a data packet) from each transmitting antenna to a second user, who in turn uses the synchronization baud to measure the channel. To illustrate, consider the following example: consider a system in which there are 2 transmitting antennas and 2 receiving antennas. The first transmitting antenna transmits a signal representing the value T1 and the second transmitting antenna transmits a signal representing the value T2. The first receiving antenna will receive a signal representing the value R1, which is a linear combination of the two values (T1 and T2) transmitted by the transmitting antennas. In other words, $R1=h_{11}*T1+h_{21}*T2$. The values $h_{11}$ and $h_{12}$ are random complex values that depend on the physical properties of the channel. For example, the values $h_{11}$ and $h_{12}$ can depend on how far away a surface a given transmitted signal bounced off of was, the material it was made of, the resultant phase shift(s), the center frequency of the subcarrier, humidity, temperature, etc. Similarly, the second receiving antenna will receive a signal representing the value R2, which is also a linear combination of the two values transmitted by the two transmitting antennas, but in general is a different linear combination. In other words, $R2=h_{21}*T1+h_{22}*T2$. So, the four values—$h_{11}$, $h_{12}$, $h_{21}$, $h_{22}$—are the numbers that physically characterize the channel. There are four such values because there are 2 transmitters and 2 receivers (2×2=4).

To facilitate synchronization, the two transmitting antennas can, for example, transmit their signals one at a time, e.g., in an alternating manner. In other words, the first transmitter transmits T1 first, and subsequently transmitter 2 transmits T2. The first signal received by the first receiving antenna is R1=$h_{11}$*T1, from which $h_{11}$ can be determined. The first signal received by the second receiving antenna is R2=$h_{21}$*T1, from which $h_{21}$ can be determined. During a next time period, the first receiving antenna receives a second signal, R1=$h_{12}$*T2, and the second receiving antenna receives a second signal, R2=$h_{22}$*T2, from which $h_{12}$ and $h_{22}$, respectively, can be determined. As such, the receiver has obtained/determined all four components of the channel. From that point on, both the first and second transmitter can transmit simultaneously and the receiver can invert the linear transform to recover T1 and T2 from ($h_{11}$*T1+$h_{12}$*T2) and ($h_{21}$*T1+$h_{22}$*T2).

In some embodiments, when there are more than 2 antennas, the matrix of channel values is a matrix with the same dimension as the number of antennas on both sides. For example, if there are 5 transmitting antennas and 7 receiving antennas, then the first receiving antenna receives R1=h11*T1+h12*T2+h13*T3+h14*T4+h15*T5, the second receiving antenna receives R2=h21*T1+h22*T2+h23*T3+h24*T4+h25*T5, and so on, down to R7=h71*T1+h72*T2+h73*T3+h74*T4+h75*T5. The resulting channel matrix is a 7×5 matrix. More generally, if there are t transmitting antennas and r receiving antennas, the channel matrix is r×t.

Next, rather than sending a signal representing the entire channel back to the first user, the second user transmits a small number of bits that correspond to a potential channel matrix from a "codebook" of possible channels that, optionally, is publicly-accessible. In other words, the first and second users have access to a previously agreed-upon set of possible channel matrices. When the second user measures the channel, the second user selects the matrix in the codebook that is closest to (i.e., that best approximates) the measured channel, and transmits, via a second processor, a string of bits that labels that matrix back to the first user. Using the foregoing approach, the first and second user can continuously measure the channel and transmit only a small subset of bits to communicate that measured channel.

In known MOPRO systems, the previously agreed-upon codebook of possible channel matrices (which is public and therefore known by the eavesdropper) is used as follows: the first user applies a deliberate "rotation" to the channel vector, so that when the second user responds with the bits corresponding to the matrix it selects from the codebook, and the eavesdropper—not knowing that rotation—cannot extract the information. Known MOPRO systems, however, remain susceptible to eavesdroppers since if an eavesdropper has a receiver that is sufficiently close in physical proximity to one of the first and second users, that eavesdropper can recover half of the secret bits, and if the eavesdropper has a receiver that is sufficiently close in physical proximity to both the first and second users, that eavesdropper can recover all of the bits. Embodiments set forth herein represent an improvement to known MOPRO systems, implemented for example via a modification to the MOPRO algorithm in which rotation to the channel vector applied by the first user is echoed, by the second user, back to the first user, thereby protecting all bits from eavesdropping.

Combining UBDM with Physical Layer Security
MIMO Review

Consider an OFDM system with a single subcarrier. The transmitter has t antennas and the receiver has r antennas. Assume that all t of the transmitting antennas simultaneously transmit a unique symbol (at the same frequency), so that transmitter n transmits the symbol $b_n$. These can be arranged into a vector $\bar{b}=(b_1, b_2, \ldots, b_t)^t$ (note that $\bar{b}$ is also referred to herein as a sequence). The r receiving antennas will each receive each of these symbols in some linear combination. In other words, the receivers $r_1, \ldots, r_r$ will receive $$r_1 = h_{11}b_1 + h_{12}b_2 + \ldots + h_{1t}b_t, \quad (0.0.1)$$
$$r_2 = h_{21}b_1 + h_{22}b_2 + \ldots + h_{2t}b_t,$$
$$\vdots$$
$$r_r = h_{R1}b_1 + h_{R2}b_2 + \ldots + h_{Rt}b_t.$$

The foregoing can be arranged this into the following matrix equation $$r = H\bar{b}, \quad (0.0.2)$$

where $$H = \begin{pmatrix} h_{11} & h_{12} & \ldots & h_{1t} \\ h_{21} & h_{22} & \ldots & h_{2t} \\ \vdots & \vdots & \ddots & \vdots \\ h_{r1} & h_{r2} & \ldots & h_{rt} \end{pmatrix} \quad (0.0.3)$$

The matrix H can be referred to as the "channel matrix," or the "channel representation." If the sequence $\bar{b}$ (or "training sequence") is known to the receiver, the receiver can use the sequence $\bar{b}$ to recover the entirety of channel matrix H. For example, if the transmission of the training sequence is not actually simultaneous, but rather the receiver transmits $b_1$ from a first transmitting antenna first, then the receiver can determine the first column of H (by virtue of the fact that it knows the value $b_1$). The receiver then receives $b_2$ from the second transmitting antenna, and the receiver in turn determines the second column of H. A similar procedure can occur for each $b_n$ of the sequence b.

Next, consider taking a singular value decomposition of H, as follows: H=UDV*. If H is an r×t matrix, then U is an r×r unitary matrix, V is a t×t unitary matrix, V* is a conjugate transpose of V, and D is a diagonal matrix containing the singular values. With high probability, H will have rank min(t, r), and therefore D will be a matrix where the first min(t, r) values are positive real values. More generally, the rank of H determines the capacity of the channel. The rank is equal to the number of independent channels that can be transmitted simultaneously between the transmitter and receiver.

MIMO Precoding

Suppose that "Alice" and "Bob" are both using a MIMO system, where "Alice" refers to the transmitter with t antennas, and "Bob" refers to the receiver with r antennas. Ideally, if Alice and Bob both have perfect knowledge of the channel matrix H, they can both perform a singular value decomposition (SVD) and obtain H=UDV$^\dagger$. Under such a circumstance, when Alice begins transmitting data to Bob, Alice could first pre-multiply her transmission $\bar{b}=(b_1, \ldots, b_t)$ by the matrix V. In other words, instead of transmitting $\bar{b}$, Alice transmits V$\bar{b}$. After being transmitted through the channel, the signal $\bar{s}$ is received by Bob in the following form:

$$\bar{b} \to Vb \xrightarrow{channel} HV\bar{b} = UDV^\dagger V\bar{b} = UD\bar{b} = \bar{s}. \quad (0.0.4)$$

Bob can then perform a "post-multiplication" (multiply $U^\dagger D$ $\bar{b}$ by $U^\dagger$, where $U^\dagger$ is a conjugate transpose of U), to obtain:

$$U^\dagger \bar{s} = U^\dagger UD\bar{b} = D\bar{b}, \quad (0.0.5)$$

The scalar singular values can then be divided out.

In practice, the foregoing procedure is not always a practical approach, for example because Alice transmits the training sequence to Bob, who computes the channel SVD and sends the entire matrix of right singular vectors V back to Alice, and then Alice does the pre-multiplication. Sending the entire matrix U back to Alice each time an update to the channel is needed or desired can be prohibitively computationally expensive and bandwidth-consuming. As such, a minimum feedback approach can alternatively be used, as set forth below.

As noted above, prior to transmission, Alice and Bob can agree on a codebook of unitary matrices, denoted $F_i$. Assuming that c bits are used to index these matrices, there are $2^c$ matrices, and the index i runs from $[0, 2^c-1]$. Bob may wish to request that Alice pre-multiply her transmissions by the true/exact right singular vectors V. Because the request to Alice may be impractical, however, Bob can instead select the unitary matrix from the codebook that is closest to (i.e., that best approximates) V. As used herein, the "closest" unitary matrix can refer to the unitary matrix that maximizes the capacity of the MIMO channel, where the capacity C of the MIMO channel can be defined by the following equation, in which $\mathbb{I}$ is the identity matrix, S/N is the signal-to-noise ratio, H is the channel representation (or matrix), and a $H^\dagger$ is a conjugate transpose of H:

$$C = \log_2\left(\det\left(\mathbb{I} + \frac{S}{N}HH^\dagger\right)\right). \quad (0.0.6)$$

Premultiplication by Fi results in a modification of the channel representation from H to $HF_i$. As such, Bob selects the "optimal" matrix $F_i$ that maximizes the capacity:

$$F_{optimal} = \max_i \log_2\left(\det\left(\mathbb{I} + \frac{S}{N}(HF_i)(HF_i)^\dagger\right)\right) \quad (0.0.7)$$

Rather than sending the entire matrix $F_i$ back to Alice, Bob can instead send only the index i back to Bob, which is a c-bit value. Because Alice has access to the codebook (e.g., because it is public), she pre-multiplies her data for transmission by the matrix $F_i$ and transmits the resulting product. Bob, in turn, can receive the message with the right singular vectors effectively removed, and can post-multiply the received message by $U^\dagger$ to remove the left singular vectors, then scale out the singular values. This approach to simplifying the channel can be referred to as "pre-coding" of the MIMO transmission, since Alice is "coding" her data prior to transmission, with a "code" (a matrix $F_i$) from a codebook (or "look-up table") of matrices with known indexing.

MIMO-OFDM Precoding (MOP)

Physical layer security can be applied to the precoding technique described above to facilitate the secure exchange of information between Alice and Bob without an eavesdropper ("Eve") being able to access the data being transmitted. As discussed above, physical layer security refers to the use of physical details of the communication channel to ensure secure communications. In some implementations, the channel matrix between Alice and Bob, denoted $H_{AB}$, and the channel matrix between Bob and Alice (assumed to be in the same bandwidth), $H_{BA}$, obey "channel reciprocity," which means that $H_{AB}=(H_{BA})^T$ (where the "T" superscript refers to the matrix transpose). On the other hand, if Eve's receiver is not in close physical proximity to Alice or Bob, then the channel between Eve and Alice, $H_{AE}=(H^{EA})^T$ and the channel between her and Bob, $H_{BE}=(H_{EB})^T$, are significantly different from $H_{AB}=(H_{BA})^T$. This means that, by virtue of the physical channel between them, Alice and Bob have a shared secret they can exploit to communicate without Eve reading their messages.

The approach used by MOP is as follows: prior to transmitting, Alice and Bob agree on a c-bit codebook of unitary matrices, as described above. Assuming that the codebook is public, Eve is presumed to know its contents. At transmission time, Alice transmits a known signal/sequence (known to everyone, including Bob and Eve), $\bar{b}$, to Bob. Bob receives $\bar{b}$ through the channel, and thus receives a transformed signal $H_{AB}\bar{b}$. Meanwhile, Eve receives $H_{AE}\bar{b}$. While this gives Eve full channel information between her and Alice, it does not tell her anything about $H_{AB}$ and therefore she does not know which matrices $F_i$ and $F_j$ Alice and Bob will compute.

Bob then uses the codebook to identify an optimal pre-coding matrix $F_i$ and an optimal post-coding matrix $F_j$. The bits corresponding to the index i and the index j are then stored by Bob as the bits of a key that he and Alice will share. Bob then transmits a known sequence (known to everyone, including Eve), which may or may not be the same sequence that Alice sent him, back to Alice. Alice receives the sequence sent by Bob via the channel $H_{BA}=(H_{AB})^T$, and uses this to also compute the optimal matrices $F_i$ and $F_j$. Assuming channel reciprocity, Alice and Bob will agree on the indices of the optimal pre-coding and post-coding matrices, and will therefore have established a shared secret. The foregoing procedure can be followed for every subcarrier or group of subcarriers, depending on system design.

Two potential security vulnerabilities associated with the foregoing procedure are that Eve may be able to either guess the channel $H_{AB}$ through physical considerations, or she might be able to move her receiver sufficiently physically close to either Alice or Bob so that for example, $H_{AB} \approx H_{AE}$. If Eve obtains even a modest approximation of the channel between Alice and Bob, the security of the system can be drastically reduced.

MOPRO

MOPRO is a modified, rotated version of MOP that addresses the security vulnerabilities noted above. In MOPRO, as in MOP, Alice and Bob agree on a c-bit codebook in advance, and this codebook can be public and known by Eve. At transmission time, Alice selects a random unitary matrix G. This matrix is known by Alice, but is unknown to Bob and Eve. Alice multiplies the publicly known sequence $\bar{b}$ by G, and transmits the result (G$\bar{b}$) to Bob. Bob, in turn, receives $H_{AB}G\bar{b}$. As such, when Bob reads off the channel, he will see the effective channel representation $H_{AB}G$, instead of H. When Bob computes the SVD of the effective channel, because G was chosen to be unitary, it only affects the right singular vectors of the channel. In other words, if $H_{AB}=UDV^\dagger$, then $H_{AB}G=UD(V^\dagger G)$. Bob will determine the left singular vectors to be given by U, the right singular vectors to be given by $V^\dagger G$, and the singular values to be given by D. At this stage, Eve has received $H_{AE}G\bar{b}$. Eve knows $\bar{b}$, but does not know G or $H_{AE}$. If the true channel between Alice and Eve is $H_{AE}=\tilde{U}\tilde{D}\tilde{V}^\dagger$, then the best Eve can do is take the SVD and find the correct left singular vectors $\tilde{U}$ and the correct singular values $\tilde{D}$, however Eve cannot determine the correct right singular vectors $\tilde{v}$, much less the properties of $H_{AB}$.

Next, Bob selects a secret of c bits, denoted herein as index n, and selects the matrix $F_n$ from the codebook. Bob then transmits some known sequence $\bar{b}'$ (again, this is publicly known by Alice, Bob, and Eve, and can be the same as $\bar{b}$ if appropriate), but first multiplies by $F_n$ and then by U* (U* representing the complex conjugate of U, not the Hermitian conjugate). In other words, Bob transmits $U^*F_n\bar{b}'$. When Alice receives Bob's transmission, it will be after the channel representation $H_{BA}$ has acted on it. As a result, Alice receives $H_{BA}U^*F_n\bar{b}'$, from which she can determine the effective channel $H_{BA}U^*F_n$. Due to channel reciprocity, however, $H_{BA}=(H_{AB})^T$, yielding:

$$H_{BA}U^*F_n=(H_{AB})^T U^*F_n= (UDV^\dagger)^T U^*F_n=V^*DU^T U^*F_n=V^*DF_n. \quad (0.0.8)$$

In view of equation 0.0.8, when Alice determines the SVD, she will obtain V* for the left singular vectors and $F_n$ for the right singular vectors. Alice can then consult the codebook to identify the index of $F_n$, and based on this index determine the secret value generated by Bob. Note that, unlike in MOP (where the shared secret bits were read from the channel), in MOPRO, Bob generates secret bits and embeds them into the channel representation. At this stage, Eve has received the effective channel representation $H_{BE}U^*F_n$, but does not know U, $F_n$, or $H_{BE}$, so even if she exhausts all of the $F_i$ matrices, she will be unable to confirm which $F_i$ Bob transmitted.

Next, Alice takes a publicly known sequence (which may be the same as the first sequence, $\bar{b}$), selects her own secret message corresponding to the index n' in the codebook, and transmits the message $VF_{n'}\bar{b}$ to Bob. Bob then receives $H_{AB}VF_{n'}\bar{b}$, from which he obtains $H_{AB}VF_{n'}=UDV^\dagger V F_{n'}=UDF_{n'}$. From this result, Bob can take the SVD, determine the right singular vectors, and look up the index of the resulting $F_{n'}$, resulting in another c bits of shared secret between him and Alice. Once again, Eve cannot read any of this information. Alice and Bob now each have the 2c shared secret bits corresponding to the secret bits n, n'. They will perform a similar procedure for each subcarrier, resulting in 2Nc bits. This procedure can be repeated until they Alice and Bob have a sufficient number of bits.

Suppose that Eve's receiver is sufficiently physically close to Alice, such that $H_{BE}\approx H_{BA}$. As a result of the first transmission, when Alice transmits $G\bar{b}$ to Bob, Eve will receive $H_{AE}G\bar{b}$. Eve knows $\bar{b}$, but she does not know $H_{AE}$ or G, so from $H_{AE}G\bar{b}$ she can only obtain the left singular vectors and the singular values of $H_{AE}$. As a result of the next transmission, when Bob transmits $U^*F_n\bar{b}$ back to Alice, Eve will receive $H_{BE}U^*F_n$, but because $H_{BE}\approx H_{BA}$, Eve can obtain $H_{BE}U^*F_n\approx H_{BA}U^*F_n=V^*DF_n$. As such, Eve is able to recover the secret information contained in the index n (as well as the matrix V). When Alice then transmits $VF_{n'}\bar{b}$ to Bob, Eve receives $H_{AE}VF_{n'}\bar{b}$, from which Eve can obtain the matrix $H_{AE}VF_{n'}$. While Eve knows the left singular vectors and the singular values of $H_{AE}$ and the matrix V, she does not know the right singular vectors of $H_{AE}$, and therefore cannot extract the matrix $F_{n'}$, nor can she obtain the second half of the secret key. Similarly, if Eve's receiver is sufficiently physically close to Bob, Eve can obtain the secret bits corresponding to the index n', but she cannot obtain the secret bits indexed by n.

Hence, if Eve's receiver is not sufficiently physically close to Alice or Bob, she cannot obtain any of the secret bits. If Eve's receiver is sufficiently physically close to Alice or Bob, she can obtain exactly half of the secret bits. If Eve's receiver is sufficiently physically close to both Bob and Alice simultaneously, Eve can unfortunately recover all of the secret bits.

Enhanced MOPRO

Enhanced MOPRO methods set forth herein enhance security as compared with known MOPRO systems by modifying the MOPRO algorithm such that, in a second transmission step (e.g., when Bob responds back to Alice, in the example above), Bob adds the right multiplication of the matrix $V^\dagger G$ before applying the matrix to his transmitters and transmitting, thereby preventing Eve from recovering any of the transmitted information, regardless of how much channel information she has.

In some embodiments, the modified MOPRO method begins (as in MOPRO) with Alice and Bob agreeing, in advance, on a publicly known codebook of unitary matrices $F_i$ for the index i that ranges from $[0, 2^c-1]$ where there are $2^c$ matrices. In a first transmission, Alice selects a random secret unitary matrix G, and transmits $G\bar{b}$, with the publicly known message $\bar{b}$. Bob, in turn, receives $H_{AB}G\bar{b}=UDV^\dagger G\bar{b}$, from which Bob can read off the left singular vectors U, the singular values D, and the effective right singular vectors $V^\dagger G$.

Next, Bob identifies c bits of his secret message, locates the corresponding c bit index (denoted herein as n), looks up the unitary matrix $F_n$ in the publicly known codebook, and constructs the matrix $U^*F_n$. Prior to transmitting, however, Bob right multiplies the matrix $U^*F_n$ by $V^\dagger G$ to obtain $U^*F_n V^\dagger G$. Bob then transmits $U^*F_n V^\dagger G\bar{b}'$, where $\bar{b}'$ is some publicly known sequence. Alice receives Bob's transmission, modified by the channel $H_{BA}$ distortion, and determines the matrix, which will be:

$$H_{BA}U^*F_n V^\dagger G = (H_{AB})^T U^*F_n V^\dagger G \quad (0.0.9)$$
$$= (UDV^\dagger)^T U^*F_n V^\dagger G$$
$$= V^*DU^T U^*F_n V^\dagger G$$
$$= V^*DF_n V^\dagger G$$

At this point, Alice can do an SVD and recover the left singular vectors V*, the singular values D, and the effective right singular vectors $F_n V^\dagger G$. Moreover, because Alice knows V (the left singular vectors) and G (because she generated it in the first place), she can multiply the right singular vectors $F_n V^\dagger G$ by $G^\dagger V$ to recover $F_n$. Next, Alice looks up this matrix in the codebook and reads off the secret bits corresponding to the index n. At this point, Alice doesn't need to transmit anything else to Bob. Bob can continuously send secrets in the same manner (assuming, for example, that the channel is static or substantially static), until a sufficient number of bits have been passed between Bob and Alice.

In some embodiments, secret generation can be performed by both Alice and Bob, in which case the first two transmissions can include: (1) Alice sending $G_1\bar{b}$ to Bob, followed by (2) Bob sending $G_2\tilde{b}'$ to Alice. In other words, during a first time period, Alice sends $G_1$ to Bob, who receives $H_{AB}G_1=UDV^\dagger G_1$ and computes the SVD to get U, D, and $V^\dagger G_1$. Then, during a second time period, Bob transmits $G_2$ to Alice, who receives $H_{BA}G=V^*DU^T G_2$. Alice then computes the SVD to get $V^*$, D, and $U^T G_2$. During a third time period, Alice chooses c secret bits corresponding to index $n_1$, and transmits $V F_n U^T G_2$ to Bob. Bob receives $H_{AB}V F_n U^T G_2=UDV^\dagger V F_n U^T G_2=UDF_{n1} U^T G_2$, from which Bob computes the SVD and gets U, D, and $F_{n1} U^T G_2$. Bob then uses his knowledge of $G_2$ and U to determine $F_{n1}$. Then, during a fourth time period, Bob selects his own c secret bits corresponding to index $n_2$ and transmits $U^*F_n V^\dagger G_1$ to Alice. Alice receives $H_{BA}U^*F_{n2} V^\dagger G_1$, from which she recovers $n_2$ in the same manner as that in which Bob recovers $n_1$. Alice and Bob can continue alternating between sending and receiving secret bits using the foregoing procedure, and even if Eve's receiver is in close physical proximity to Alice and/or Bob, she will be unable to recover any of the secret information.

Figure 8:
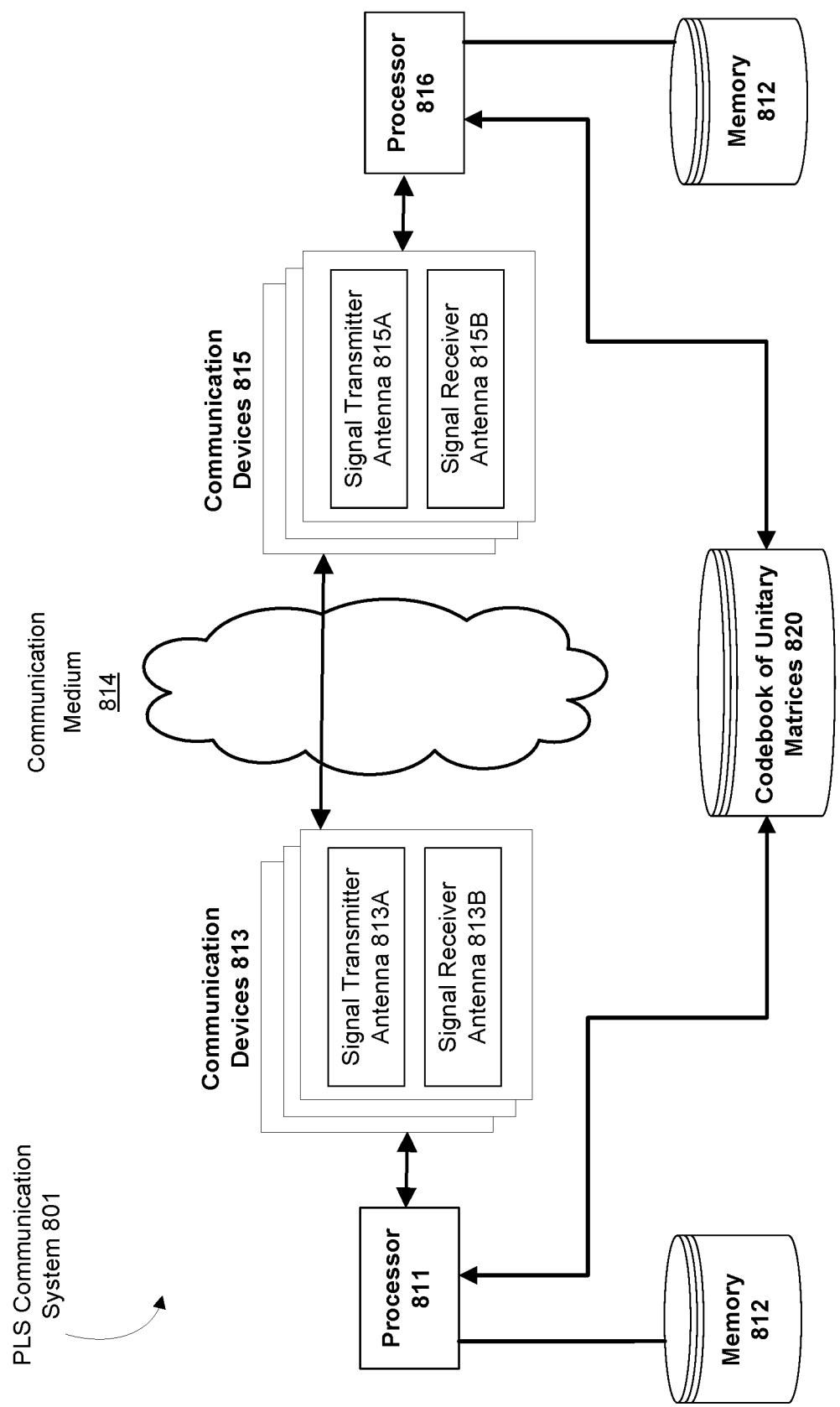
FIG. 8 is a schematic representation of a communication system using UBDM or OFDM with physical layer security, according to an embodiment.

FIG. 8 is a schematic representation of a communication system using UBDM or OFDM with physical layer security, according to an embodiment. As shown in FIG. 8, the PLS communication system 801 includes a first set of communication devices 813 and a second set of communication devices 815, communicably coupled to one another via a communication medium 814 (e.g., free space, a multipath wireless environment, etc.). The first set of communication devices 813 is communicably coupled to a first processor 811, and the second set of communication devices 815 is communicably coupled to a second processor 816. The first processor 811 is operably coupled to a memory 812 and the second processor 816 is operably coupled to a memory 812. Each of the first processor 811 and the second processor 816 is operably coupled to a storage repository storing a codebook of unitary matrices 820, which may be publicly-accessible. During operation of the PLS communication system 801, the processor 811 produces a first encoded vector and transmits the first encoded vector to the second set of communication devices 815 via a communication channel of the communication medium 814. The communication channel applies a channel transformation to the first encoded vector during transmission, thereby producing a transformed signal. The second processor 816 receives the transformed signal, determines an effective channel representation/matrix thereof, and identifies left and right singular vectors of the effective channel. The second processor 816 selects a precoding matrix from the codebook of unitary matrices 820 based on a message, and produces a second encoded vector based on a second known vector, the precoding matrix, a complex conjugate of the left singular vectors, and the right singular vectors. The second processor 816 then sends the second encoded vector to the first set of communication devices 813 for identification of the message.

Figure 9:
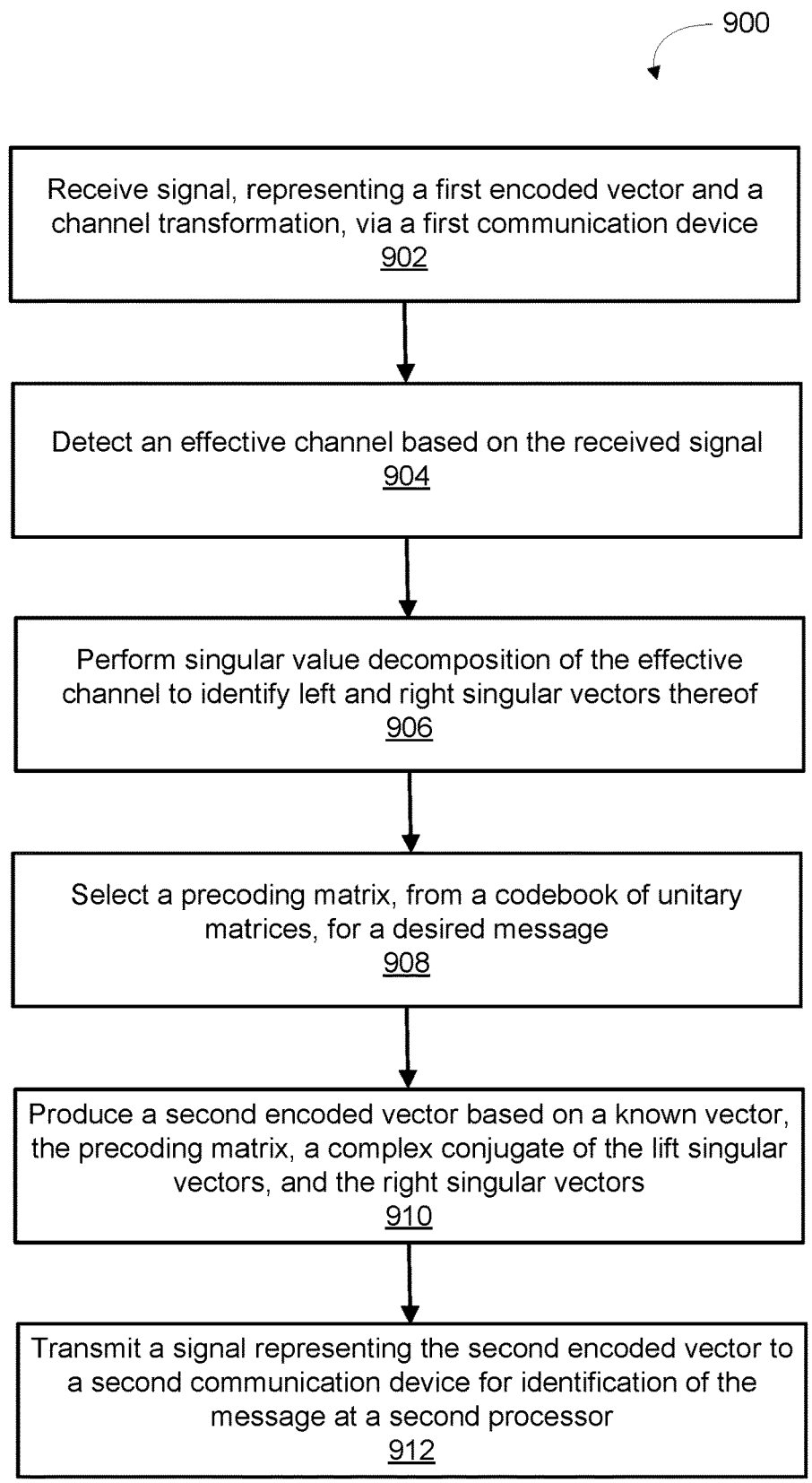
FIG. 9 is a flowchart illustrating a method of communicating using UBDM or OFDM with physical layer security, according to an embodiment.

FIG. 9 is a flowchart illustrating a method of communicating using UBDM or OFDM with physical layer security, according to an embodiment. As shown in FIG. 9, the method 900 includes receiving, at 902, via a first communication device and at a first processor, a signal representing a first encoded vector and a channel transformation. The first processor detects, at 904, a representation of an effective channel based on the received signal, and at 906 performs a singular value decomposition of the representation of the effective channel to identify left singular vectors of the representation of the effective channel and right singular vectors of the representation of the effective channel. At 908, the first processor selects a precoding matrix from a codebook of unitary matrices, the precoding matrix associated with an index for a message for transmission. The first processor produces a second encoded vector, at 910, based on a known vector, the precoding matrix, a complex conjugate of the left singular vectors, and the right singular vectors of the representation of the effective channel, and at 912 transmits a signal representing the second encoded vector, through a communication channel, to a second communication device, for identification of the message at a second processor operably coupled to the second communication device.

Figure 10:
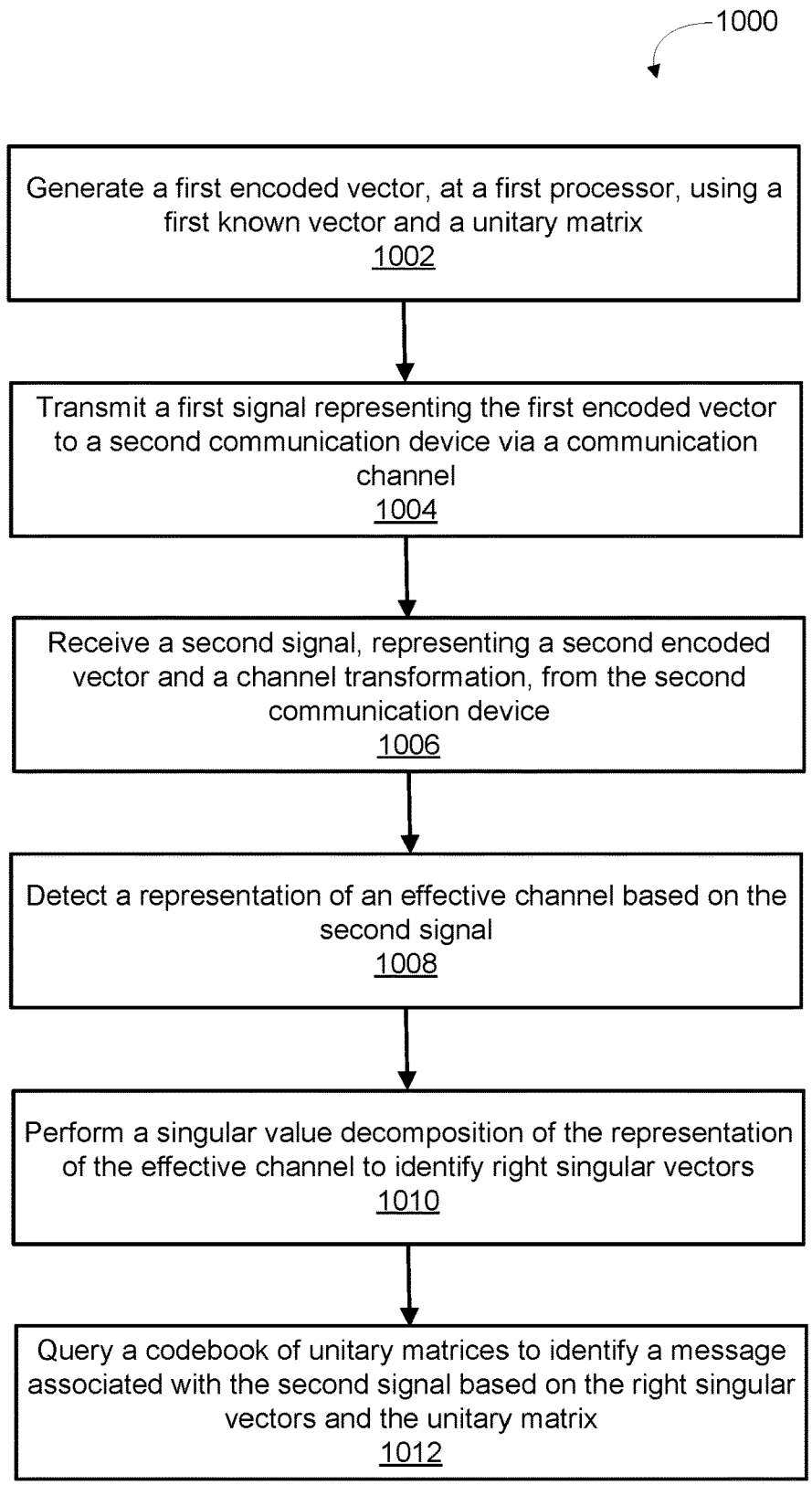
FIG. 10 is a flowchart illustrating a method of communicating using UBDM or OFDM with physical layer security, according to an embodiment.

FIG. 10 is a flowchart illustrating a method of communicating using UBDM or OFDM with physical layer security, according to an embodiment. As shown in FIG. 10, the method 1000 includes generating, at 1002 and via a first processor of a first communication device, a first encoded vector using a first known vector and a unitary matrix. A first signal representing the first encoded vector is transmitted, at 1004, to a second communication device through a communication channel that applies a channel transformation to the first signal during transmission. A second signal representing a second encoded vector and the channel transformation is received at the first processor (at 1006) from the second communication device, and at 1008 the first processor detects a representation of an effective channel based on the second signal. The first processor performs a singular value decomposition of the representation of the effective channel, at 1010, to identify right singular vectors of the representation of the effective channel, and queries a codebook of unitary matrices at 1012 to identify a message associated with the second signal based on the right singular vectors of the representation of the effective channel and the unitary matrix.

In some embodiments, a communication method using UBDM or OFDM with physical layer security includes applying an arbitrary transformation to a plurality of vectors to produce a plurality of transformed vectors. The arbitrary transformation includes one of a unitary transformation, an equiangular tight frame (ETF) transformation, or a nearly equiangular tight frame (NETF) transformation. Using the arbitrary transformation, a transformed signal is produced based on at least one transformed vector from the plurality of transformed vectors. The transformed signal is transmitted, via a communications channel, to a signal receiver that is configured to detect the transformed signal. A signal representing the arbitrary transformation is provided to the signal receiver, for recovery of the plurality of vectors at the signal receiver based on the arbitrary transformation and one of a location-specific physical characteristic of the communications channel or a device-specific physical characteristic of the communications channel.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The invention claimed is:

1. A system, comprising:
a first plurality of communication devices having access to a codebook of unitary matrices;
a second plurality of communication devices having access to the codebook of unitary matrices;
at least one processor operatively coupled to the first plurality of communication devices, the at least one processor configured to:
transmit a signal representing a first encoded vector to the second plurality of communication devices; and
at least one processor operatively coupled to the second plurality of communication devices, the at least one processor configured to:
receive a transformed signal including a transformed version of the first encoded vector,
detect a representation of an effective channel based on the transformed signal,
identify left singular vectors of the representation of the effective channel and right singular vectors of the representation of the effective channel,
select a precoding matrix from the codebook of unitary matrices based on a message for transmission,
produce a second encoded vector based on the precoding matrix, a complex conjugate of the left singular vectors of the representation of the effective channel, and the right singular vectors of the representation of the effective channel, the at least one processor configured to produce the second encoded vector by:
multiplying the complex conjugate of the left singular vectors of the representation of the effective channel by the precoding matrix to produce an intermediate matrix; and
right multiplying the intermediate matrix by the right singular vectors of the representation of the effective channel to produce the second encoded vector, and
transmit a signal representing the second encoded vector to the first plurality of communication devices for identification of the message.

2. The system of claim 1, wherein at least one of the first plurality of communication devices or the second plurality of communication devices includes a plurality of antenna arrays, the first plurality of communication devices and the second plurality of communication devices configured to perform Multiple Input Multiple Output (MIMO) operations.

3. The system of claim 1, wherein the codebook of unitary matrices is publicly-accessible.

4. The system of claim 1, wherein the precoding matrix is a first precoding matrix, and the message is a first message, the at least one processor operatively coupled to the second plurality of communication devices is further configured to:
select a second precoding matrix, from the codebook of unitary matrices, for a second message for transmission,
produce a third encoded vector based on a known vector, the second precoding matrix, the complex conjugate of the left singular vectors of the representation of the effective channel, and the right singular vectors of the representation of the effective channel, and
transmit a signal representing the third encoded vector to the first plurality of communication devices for identification of the second message.

5. The system of claim 1, wherein the at least one processor operatively coupled to the second plurality of communication devices is further configured to transmit signals representing a plurality of additional encoded vectors to the first plurality of communication devices until a predetermined number of messages have been sent.

6. The system of claim 1, wherein the at least one processor operatively coupled to the second plurality of communication devices is configured to select the precoding matrix from the codebook of unitary matrices based further on maximizing a capacity of a MIMO channel.

7. A method, comprising:
receiving, via a first communication device and at a first processor, a signal representing a first encoded vector;
detecting, via the first processor, a representation of an effective channel based on the received signal;
identifying left singular vectors of the representation of the effective channel and right singular vectors of the representation of the effective channel;
selecting, via the first processor, a precoding matrix, from a codebook of unitary matrices, for a message for transmission;
multiplying a complex conjugate of the left singular vectors of the representation of the effective channel by the precoding matrix to produce an intermediate matrix;
right multiplying the intermediate matrix by the right singular vectors of the representation of the effective channel to produce a second encoded vector; and
transmitting a signal representing the second encoded vector to a second communication device, to cause a second processor operably coupled to the second communication device to identify the message.

8. The method of claim 7, wherein at least one of the first communication device or the second communication device includes a plurality of antennas, the first communication device and the second communication device configured to perform Multiple Input Multiple Output (MIMO) operations.

9. The method of claim 7, wherein the codebook of unitary matrices is publicly-accessible.

10. The method of claim 7, wherein the precoding matrix is a first precoding matrix and the message is a first message, the method further comprising:
selecting a second precoding matrix from the codebook of unitary matrices, the second precoding matrix associated with a second message for transmission,
producing a third encoded vector based on the second precoding matrix, the complex conjugate of the left singular vectors, and the right singular vectors of the representation of the effective channel, and
transmitting a signal representing the third encoded vector to cause the second communication device to identify the second message.

11. The method of claim 7, further comprising transmitting signals representing a plurality of additional encoded vectors to the second communication device until a predetermined number of messages have been sent.

12. The method of claim 7, wherein the selecting the precoding matrix from the codebook of unitary matrices is based on maximizing a capacity of a MIMO channel.

13. A non-transitory, processor-readable medium storing processor-executable instructions to cause a first processor to:
detect a representation of an effective channel based on a signal received via a first communication device, the signal representing a first encoded vector;
identify left singular vectors of the representation of the effective channel and right singular vectors of the representation of the effective channel;
select a precoding matrix, from a codebook of unitary matrices, for a message for transmission;
multiply a complex conjugate of the left singular vectors by the precoding matrix to produce an intermediate matrix;
right multiply the intermediate matrix by the right singular vectors of the representation of the effective channel to produce a second encoded vector; and
transmit a signal representing the second encoded vector to a second communication device, to cause a second processor operably coupled to the second communication device to identify the message.

14. The non-transitory, processor-readable medium of claim 13, wherein at least one of the first communication device or the second communication device includes a plurality of antennas, the first communication device and the second communication device configured to perform Multiple Input Multiple Output (MIMO) operations.

15. The non-transitory, processor-readable medium of claim 13, wherein the codebook of unitary matrices is publicly-accessible.

16. The non-transitory, processor-readable medium of claim 13, wherein the precoding matrix is a first precoding matrix and the message is a first message, the processor-readable medium further storing processor-executable instructions to cause the first processor to:
select a second precoding matrix from the codebook of unitary matrices, the second precoding matrix associated with a second message for transmission,
produce a third encoded vector based on the second precoding matrix, the complex conjugate of the left singular vectors, and the right singular vectors of the representation of the effective channel, and
transmit a signal representing the third encoded vector to the second communication device for identification of the second message.

17. The non-transitory, processor-readable medium of claim 13, wherein the processor-readable medium further stores processor-executable instructions to transmit signals representing a plurality of additional encoded vectors to the second communication device until a predetermined number of messages have been sent.

18. The non-transitory, processor-readable medium of claim 13, wherein the processor-executable instructions to select the precoding matrix, from the codebook of unitary matrices, for the message for transmission, include instructions to select the precoding matrix from the codebook of unitary matrices based on maximizing a capacity of a MIMO channel.

* * * * *